(12) United States Patent
Wilson et al.

(10) Patent No.: US 10,666,054 B2
(45) Date of Patent: May 26, 2020

(54) NONLINEAR POWER FLOW CONTROL FOR NETWORKED AC/DC MICROGRIDS

(71) Applicants: National Technology & Engineering Solutions of Sandia, LLC, Albuquerque, NM (US); Michigan Technological University, Houghton, MI (US)

(72) Inventors: David G. Wilson, Tijeras, NM (US); Rush D. Robinett, III, Tijeras, NM (US); Wayne W. Weaver, Hancock, MI (US); Steven F. Glover, Albuquerque, NM (US)

(73) Assignees: National Technology & Engineering Solutions of Sandia, LLC, Albuquerque, NM (US); Michigan Technological University, Houghton, MI (US)

( * ) Notice: Subject to any disclaimer, the term of this patent is extended or adjusted under 35 U.S.C. 154(b) by 39 days.

(21) Appl. No.: 15/982,850

(22) Filed: May 17, 2018

(65) Prior Publication Data

US 2018/0366952 A1    Dec. 20, 2018

Related U.S. Application Data

(60) Provisional application No. 62/522,534, filed on Jun. 20, 2017.

(51) Int. Cl.
*H02J 3/38* (2006.01)
*G05F 1/66* (2006.01)
(Continued)

(52) U.S. Cl.
CPC ............... *H02J 3/382* (2013.01); *G05F 1/66* (2013.01); *H02J 3/381* (2013.01); *H02J 7/34* (2013.01);
(Continued)

(58) Field of Classification Search
CPC ....................................................... H02J 3/382
See application file for complete search history.

(56) References Cited

U.S. PATENT DOCUMENTS 7,741,795 B2 * 6/2010 Kalev ..................... H02P 25/08
318/150
2010/0292852 A1 * 11/2010 Gertmar ................ H02J 3/1842
700/287

(Continued)

OTHER PUBLICATIONS

Wikipedia contributors. "Steady state (electronics)." Wikipedia, The Free Encyclopedia. Wikipedia, The Free Encyclopedia, Jan. 17, 2020. Web. Apr. 9, 2020. (Year: 2020).*

(Continued)

*Primary Examiner* — Daniel J Cavallari
(74) *Attorney, Agent, or Firm* — Kevin W. Bieg

(57) ABSTRACT

A method for designing feedforward and feedback controllers for integration of stochastic sources and loads into a nonlinear networked AC/DC microgrid system is provided. A reduced order model for general networked AC/DC microgrid systems is suitable for HSSPFC control design. A simple feedforward steady state solution is utilized for the feedforward controls block. Feedback control laws are provided for the energy storage systems. A HSSPFC controller design is implemented that incorporates energy storage systems that provides static and dynamic stability conditions for both the DC random stochastic input side and the AC random stochastic load side. Transient performance was investigated for the feedforward/feedback control case. Numerical simulations were performed and provided power and energy storage profile requirements for the networked AC/DC microgrid system overall performance. The HSSPFC design can be implemented in the Matlab/Simulink environment that is compatible with real time simulation/controllers.

6 Claims, 22 Drawing Sheets

(51) Int. Cl.
*H02J 7/34* (2006.01)
*H02J 3/32* (2006.01)
*H02J 3/30* (2006.01)

(52) U.S. Cl.
CPC . *H02J 3/30* (2013.01); *H02J 3/32* (2013.01); *H02J 2203/20* (2020.01); *Y02E 10/38* (2013.01); *Y02E 10/563* (2013.01); *Y02E 10/763* (2013.01)

(56) References Cited

U.S. PATENT DOCUMENTS

2013/0155732 A1* 6/2013 Wagoner ............ H02J 3/01 363/40
2018/0115160 A1* 4/2018 Tuladhar ............ H02J 3/01

OTHER PUBLICATIONS

Wikipedia contributors. "Ring network." Wikipedia, The Free Encyclopedia. Wikipedia, The Free Encyclopedia, Feb. 18, 2020. Web. Apr. 9, 2020. (Year: 2020).*

Hassell, T. et al., "Modeling of Inverter Based Ac Microgrids for Control Development", 2015 IEEE Conference on Control Applications (CCA), Part of 2015 IEEE Multi-Conference on Systems and Control, Sep. 21-23, 2015. Sydney, Australia, pp. 1347-1353.

Robinett III, R. et al., "Nonlinear Power Flow Control Design for Combined Conventional and Variable Generation Systems: Part I-Theory", 2011 IEEE International Conference on Control Applications (CCA), Part of 2011 IEEE Multi-Conference on Systems and Control, Denver, CO, USA. Sep. 28-30, 2011, pp. 61-64.

Wilson, D.G. et al., "Transient Stability and Performance Based on Nonlinear Power Flow Control Design of Renewable Energy Systems", 2011 IEEE International Conference on Control Applications (CCA), Part of 2011 IEEE Multi-Conference on Systems and Control, Denver, CO, USA. Sep. 28-30, 2011, pp. 881-886.

Weaver, W.W. et al., Distributed control and energy storage requirements of networked Dc microgrids, Control Engineering Practice 44 (2015), pp. 10-19.

Weaver, W.W. et al., "Energy storage requirements of dc microgrids with high penetration renewables under droop control", Electrical Power and Energy Systems 68 (2015), pp. 203-209.

Wilson, D.G. et al., "Renewable Energy Microgrid Control with Energy Storage Integration", 2012 International Symposium on Power Electronics, Electrical Drives, Automation and Motion, Speedam, Jun. 20-22, 2012, Sorrento, Italy, pp. 158-163.

Wilson, D.G. et al., "Nonlinear Power Flow Control Design of High Penetration Renewable Sources for AC Inverter Based Microgrids", 2016 International Symposium on Power Electronics, Electrical Drives, Automation and Motion, SPEEDAM, Jun. 22-24, 2016, Anacapri, Italy, pp. 701-708.

* cited by examiner

NONLINEAR POWER FLOW CONTROL FOR NETWORKED AC/DC MICROGRIDS

CROSS-REFERENCE TO RELATED APPLICATION

This application claims the benefit of U.S. Provisional Application No. 62/522,534, filed Jun. 20, 2017, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to electric power grids and, in particular, to the control of power flow in microgrid systems.

BACKGROUND OF THE INVENTION

Recent literature has indicated that there exists a trade-off in information and power flow and that intelligent, coordinated control of power flow in a microgrid system can modify energy storage hardware requirements. The future electric power grid and corresponding microgrid systems will require new mathematical tools and methodologies to support high penetration of renewable energy sources such as solar and wind and provide specific optimized designs. Current unidirectional power flow from source to load will be replaced by bi-directional power flow as new generation sources are being distributed onto the future electric power grid. Renewable and other distributed energy sources cannot be economically and reliably integrated into the existing grid because it has been optimized over decades to support large centralized generation sources.

A recent review focused on hierarchical controls covering three main levels and identified that future control trends needed further research in interconnected microgrids. See E. Unamuno and J. A. Barrera, *Renew. Sust. Energy Rev.* 52, 1123 (2015). The problems and solutions of power quality in microgrids, distributed-energy storage systems, and hybrid AC/DC microgrids, including power quality enhancement, cooperative control for voltage enhancement, harmonics, and unbalances in microgrids have also been reviewed. See J. M. Guerrero et al., *IEEE Trans. Ind. Electron.* 60(4), 1263 (2013). A static synchronous compensator (STATCOM) in grid-connected microgrid was introduced to improve voltage sags/swells and unbalance. A model has been developed to study the impact of power sharing controllers and delays in microgrid stability. See A. Kahrobaeian and Y. a.-R. I. Mohamed, *IEEE Trans. Power Electron.* 30(2), 603 (2015). The effectiveness of the proposed controller was presented through comparative simulation and experimental results. Advanced control techniques have been reviewed, including decentralized, distributed, and hierarchical control of grid-connected and islanded microgrids that consider stability. See J. M. Guerrero et al., *IEEE Trans. Ind. Appl.* 60(4), 1254 (2013). For large scale energy storage/wind penetration, cyber protection and other stability and power sharing analysis techniques for droop control for transmission systems can be included. See A. Di Giorgio et al., *Real Time Optimal Power Flow Integrating Large Scale Storage Devices and Wind Generation*, 23$^{rd}$ Mediterranean Conference on Control and Automation, MED 2015; A. DiGiorgio et. al., *On the Optimization of Energy Storage System Placement for Protecting Power Transmission Grids Against Dynamic Load Altering Attacks*, 25$^{th}$ Mediterranean Conference on Control and Automation, MED 2017; and D. Zonetti et al., *IEEE Trans. Control Netw. Syst.* PP(99), 1 (2017).

Today's grid model is based on excess generation capacity (largely fossil fuel), static distribution/transmission systems, and essentially open loop control of power flow between sources and loads. Research investments in grid modernization and microgrids are presently being made by the Department of Energy, Department of Defense, and others. See H. R. Baghaee et al., "A Decentralized Power Management and Sliding Mode Control Strategy for Hybrid AC/DC Microgrids including Renewable Energy Sources, accepted for publication in *IEEE Trans. Ind. Informat.* (2017); E. Unamuno and J. A. Barrera, J. A., *Renew. Sust. Energy Rev.* 52, 1123 (2015); J. M. Guerrero et al., *IEEE Trans. Ind. Electron.* 60(4), 1263 (2013); A. Kahrobaeian and Y. a.-R. I. Mohamed, *IEEE Trans. Power Electron.* 30(2), 603 (2015); J. M. Guerrero et al., *IEEE Trans. Ind. Appl.* 60(4), 1254 (2013); W. W. Weaver et al., *Control Eng. Pract.* 44, 10 (2015); F. Luo et al., *A Generalized Droop-Control Scheme for Decentralized Control of Inverter-Interfaced Microgrids*, in IEEE International Symposium on Circuits and Systems, 2013, pp. 1320-1323; and W. W. Weaver et al., *Int. J. Electr. Power Energy Syst.* 68, 203 (2015). Other approaches have been developed that optimize distributed energy systems to improve efficiency of the energy resources. See M. Di Somma et al., *Energy Convers. Manage.* 103, 739 (2015).

SUMMARY OF THE INVENTION

This present invention is directed to a power control methodology that addresses the high penetration of variable generation or renewable energy sources for networked AC/DC microgrid systems as an islanded subsystem or as part of larger electric power grid systems. The invention provides both a control methodology and realizable hierarchical controllers that are based on a Hamiltonian Surface Shaping and Power Flow Control (HSSPFC) methodology that regulates renewable energy sources and varying loads and identifies energy storage requirements for a networked AC/DC microgrid system. See R. D. Robinett III and D. G. Wilson, *Nonlinear Power Flow Control Design: Utilizing Exergy, Entropy, Static and Dynamic Stability, and Lyapunov Analysis*, Springer-Verlag, London Ltd., October 2011. Both static and dynamic stability conditions are obtained for the networked AC/DC microgrid system. As a proof-of-concept of the invention, numerical simulations were performed to demonstrate stability and transient performance. A feedback/feedforward example of a single varying generator representing a varying source (i.e., photovoltaic, wind, or wave energy) along with two constant generators (representing diesel or gas turbine) along with a varying load profile demonstrates both feedback/feedforward control system stability and transient performance benefits. The HSSPFC control architecture can help to identify power and energy storage requirements throughout the networked microgrid system both as a design tool and as a control algorithm implemented as a decentralized controller.

BRIEF DESCRIPTION OF THE DRAWINGS

The detailed description will refer to the following drawings, wherein like elements are referred to by like numbers.

DETAILED DESCRIPTION OF THE INVENTION

Figure 1:
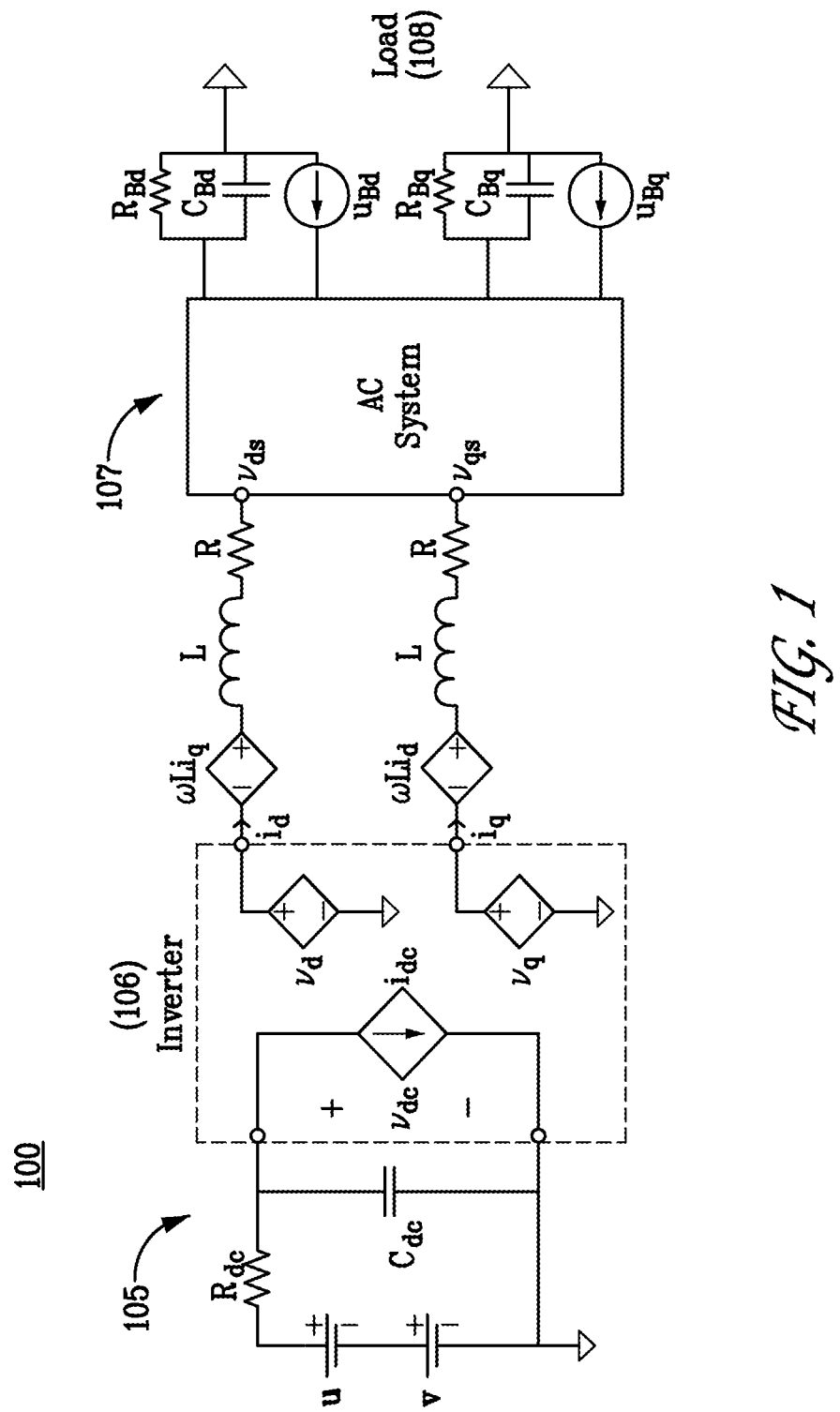
FIG. 1 is an illustration of an AC inverter model with energy storage controls at input and load characterized as part of the ODQ decomposition.

Achieving regulation and power balance in a system with high penetration levels of stochastic renewable sources are some of the challenges addressed by the present invention. The problem can be solved provided enough energy storage is available. Realistically, energy storage systems and/or information flow are costly and both need to be minimized and balanced with respect to the performance objectives. The method of the present invention distributes the control of energy storage and power converters while attempting to minimize physical energy storage by using information flow between controllers to help strike a balance between both. See R. D. Robinett III and D. G. Wilson, *Nonlinear Power Flow Control Design: Utilizing Exergy, Entropy, Static and Dynamic Stability, and Lyapunov Analysis*, Springer-Verlag, London Ltd., October 2011; and W. W. Weaver et al., *Control Eng. Pract.* 44, 10 (2015).

According to the invention, an optimized distribution of energy storage and power conversion in a microgrid can be achieved by providing a control system with three parts: a feedforward or dynamic optimization control, a Hamiltonian-based feedback control, and a servo control. A centralized algorithm provides feedforward control by computing reference duty cycle values and reference states at a much slower update rate that optimizes a cost function that can include boost converter set point update rates, energy storage use, and/or parasitic losses in the system. The feedforward control identifies the optimal operating point and can be determined using optimization methods. See J. Young, *Optizelle: An open source software library designed to solve general purpose nonlinear optimization problems*, 2014, www.optimojoe.com, Open source software; D. G. Wilson et al., *Renewable Energy Microgrid Control with Energy Storage Integration*, International Symposium on Power Electronics, Electrical Drives, Automation and Motion, SPEEDAM, Jun. 20-22, 2012, Sorrento, Italy; and R. D. Robinett III et al., *Applied Dynamic Programming for Optimization of Dynamical Systems*, SIAM, Advances in Design and Control Series, July 2005. As an example, a very simple steady-state solution is realized as a proof-of-concept of the invention. The feedback portion is a local decentralized feedback controller that is designed to minimize variability in the power delivered to the boost converters. See R. D. Robinett III and D. G. Wilson, *Nonlinear Power Flow Control Design: Utilizing Exergy, Entropy, Static and Dynamic Stability, and Lyapunov Analysis*, Springer-Verlag, London Ltd., October 2011; W. W. Weaver et al., *Control Eng. Pract.* 44, 10 (2015); W. W. Weaver et al., *Int. J. Electr. Power Energy Syst.* 68, 203 (2015); D. G. Wilson et al., *Renewable Energy Microgrid Control with Energy Storage Integration*, International Symposium on Power Electronics, Electrical Drives, Automation and Motion, SPEEDAM, Jun. 20-22, 2012, Sorrento, Italy; R. D. Robinett III and D. G. Wilson, *Nonlinear Power Flow Control Design for Combined Conventional and Variable Generation Systems: Part I—Theory*, 2011 IEEE Multi-Conference on Systems and Control, Sep. 26-30, 2011, Denver, Co., USA, pp. 61-64; and R. D. Robinett III and D. G. Wilson, *Transient Stability and Performance Based on Nonlinear Power Flow Control Design of Renewable Energy Systems*, 2011 IEEE Multi-Conference on Systems and Control, Sep. 26-30, 2011, Denver, Co., USA, pp. 881-886. The servo control supports the Hamiltonian-based control by regulating certain components to specified voltages/currents at the fastest update rates which correspond to the actual boost converter hardware inputs.

The invention is described in detail below. First, a reduced order networked AC/DC microgrid model is described. Next, an HSSPFC controller for the networked AC/DC microgrid is described which includes both the feedforward and feedback developments. Numerical simulations are performed that validate and demonstrate proof-of-concept for the HSSPFC controller.

Reduced Order Networked AC/DC Microgrid Model

The goal of Reduced Order Models (ROMs) is to capture the critical dynamics of the microgrid system for control design and reference model trajectories as part of the feedforward system with correction being applied by the feedback system. ROMs were initially developed as part of a HSSPFC design process. See R. D. Robinett III and D. G. Wilson, *Nonlinear Power Flow Control Design: Utilizing Exergy, Entropy, Static and Dynamic Stability, and Lyapunov Analysis*, Springer-Verlag, London Ltd., October 2011. Models were developed for separate single/networked DC microgrid systems and AC microgrid systems. See W. W. Weaver et al., *Cont. Eng. Pract.* 44, 10 (2015); W. W.

Weaver et al., *Int. J. Electr. Power Energy Syst.* 68, 203 (2015); D. G. Wilson et al., *Renewable Energy Microgrid Control with Energy Storage Integration*, International Symposium on Power Electronics, Electrical Drives, Automation and Motion, SPEEDAM, Jun. 20-22, 2012, Sorrento, Italy; T. Hassell et al., *Modeling of Inverter Based AC Microgrids for Control Development*, IEEE MSC Conference, Sydney, Australia, Sep. 20-22, 2015; D. G. Wilson et al., *Hamiltonian Control Design for DC Microgrids with Stochastic Sources and Loads with Applications*, in IEEE International Symposium on Power Electronics, Electrical Drives, Automation and Motion, SPEEDAM, 2014, pp. 1264-1271; D. G. Wilson et al., *Nonlinear Power Flow Control Design of High Penetration Renewable Sources for AC Inverter Based Microgrids*, in IEEE International Symposium on Power Electronics, Electrical Drives, Automation and Motion, SPEEDAM, Jun. 22-24, 2016, AnaCapri, Italy; and R. D. Robinett III et al., U.S. Pat. No. 9,263,894, issued Feb. 16, 2016. The initial model for an AC/DC system for a single inverter was developed by Hassell and employed for HSSPFC control design by Wilson. See T. Hassell et al., *Modeling of Inverter Based AC Microgrids for Control Development*, IEEE MSC Conference, Sydney, Australia, Sep. 20-22, 2015; and D. G. Wilson et al., *Nonlinear Power Flow Control Design of High Penetration Renewable Sources for AC Inverter Based Microgrids*, in IEEE International Symposium on Power Electronics, Electrical Drives, Automation and Motion, SPEEDAM, Jun. 22-24, 2016, AnaCapri, Italy. This model is briefly described below and novel networked AC/DC microgrids and HSSPFC control are described in further detail.

Single AC/DC Microgrid

An AC inverter microgrid model 100 is shown in FIG. 1. The AC inverter microgrid model is based on a single boost converter (full details for this model are given in Hassell and Wilson). See T. Hassell et al., *Modeling of Inverter Based AC Microgrids for Control Development*, IEEE MSC Conference, Sydney, Australia, Sep. 20-22, 2015; and D. G. Wilson et al., *Nonlinear Power Flow Control Design of High Penetration Renewable Sources for AC Inverter Based Microgrids*, in IEEE International Symposium on Power Electronics, Electrical Drives, Automation and Motion, SPEEDAM, Jun. 22-24, 2016, AnaCapri, Italy. It is fed by voltage sources, representing variable/stochastic renewable energy sources v, such as wind or solar, in series with an energy storage source u. These inputs are connected to a DC bus 105 that is then connected to a 3-phase AC bus 107 through an AC inverter 106 and power line RL filter. The 3-phase AC system 107 and load 108 are modeled through a direct quadrature (DQ) reference frame as an equivalent 2-phase DC network. An energy storage source $u_B$ is also connected to the AC bus 107 to inject power onto the AC bus 107 to support variations in the load 108.

The circuit equations for the DC-AC converter and AC bus models are given by Hassell. See T. Hassell et al., *Modeling of Inverter Based AC Microgrids for Control Development*, IEEE MSC Conference, Sydney, Australia, Sep. 20-22, 2015. The transformed three-phase inverter in ODQ frame is defined as $$L\frac{di_d}{dt} = -Ri_d + \omega L i_q + v_d - v_{d_s} \quad (1)$$
$$L\frac{di_q}{dt} = -Ri_q - \omega L i_d + v_q - v_{q_s}$$

with $$v_{d_\square} = \begin{Bmatrix} 0 \\ v_d \\ v_q \end{Bmatrix} = \begin{Bmatrix} 0 \\ \beta\lambda c\phi \\ \beta\lambda s\phi \end{Bmatrix} v_{dc} \quad (2)$$

where $$\beta = \frac{1}{2}\sqrt{\frac{3}{2}},$$

$c\phi = \cos\phi$, and $s\phi = \sin\phi$, $\lambda = 1-D$, and D is the duty cycle switch. Simplifying the equations yields $$L\frac{di_d}{dt} = -Ri_d + \omega L i_q + \beta\lambda c\phi - v_{d_s} \quad (3)$$
$$L\frac{di_q}{dt} = -Ri_q - \omega L i_d + \beta\lambda s\phi - v_{q_s}$$
$$C_{dc}\frac{dv_{d_s}}{dt} = (v_1 + u_1 - v_{dc})/R_{dc} - \beta\lambda(c\phi i_d + s\phi i_q)$$

The AC bus equations become $$C_B\frac{dv_{d_s}}{dt} = i_d - \frac{v_{d_s}}{R_B} + u_{B_d} + \omega C_B v_{q_s} \quad (4)$$
$$C_B\frac{dv_{q_s}}{dt} = i_q - \frac{v_{q_s}}{R_B} + u_{B_q} - \omega C_B v_{d_s}.$$

See T. Hassell et al., *Modeling of Inverter Based AC Microgrids for Control Development*, IEEE MSC Conference, Sydney, Australia, Sep. 20-22, 2015. In traditional AC power systems, the bus load is modeled as inductive (e.g., historical inductive motors). However, modern power electronics based loads (motors) can contain power factor correction front ends where the bus terminal characteristics can be directly controlled. The AC bus load model here assumes a RC load (provides derivative of the voltage). Additionally, a slightly capacitive load could represent a model of a load with a power electronics based front end.

Networked AC/DC Microgrid

Figure 2:
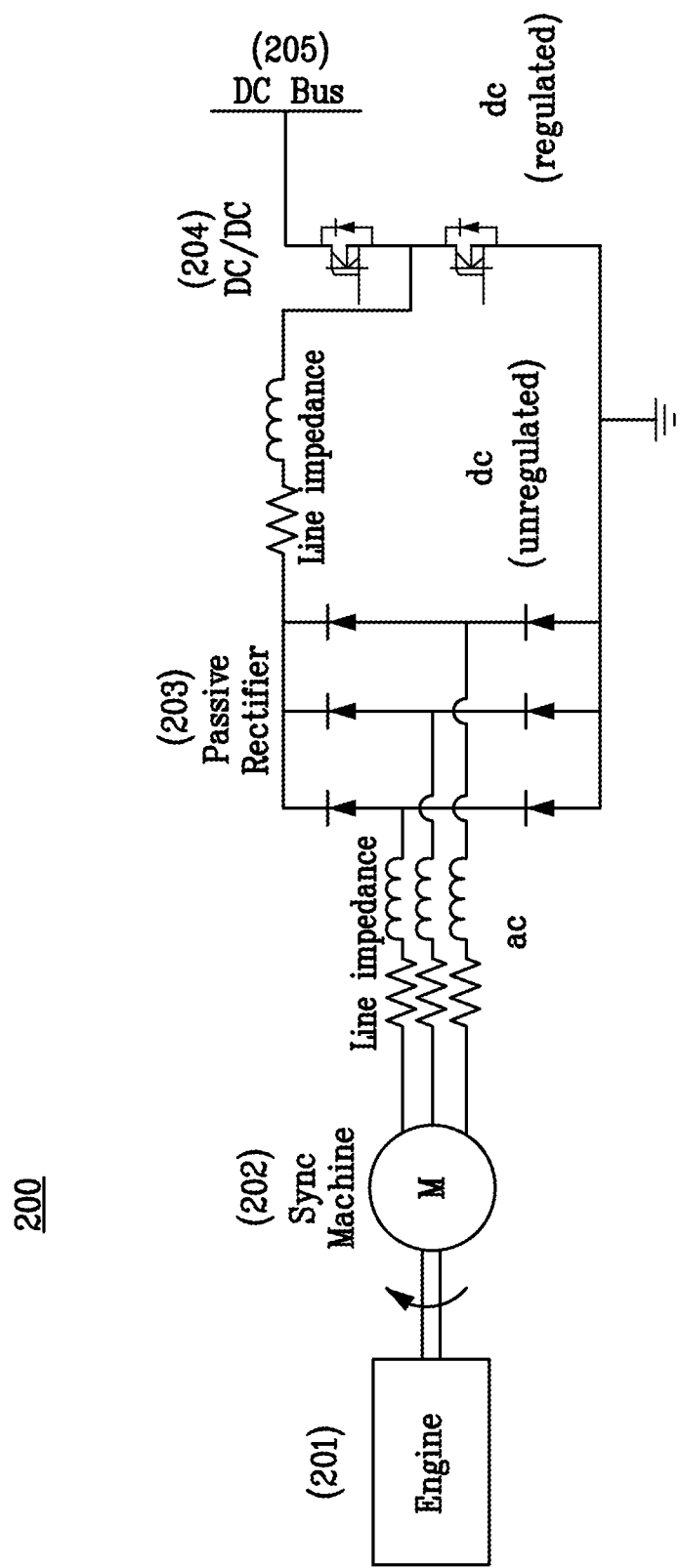
FIG. 2 is an illustration of a standard engine-to-DC generator.

For this application the microgrid system is configured as stand-alone and isolated. Multiple energy storage devices are placed for future optimization trade studies. The networked AC/DC microgrid ROM is developed based on the following assumptions: i) the diesel engine dynamics are simplified and replaced by a DC source, storage device, and boost converter. The standard engine-to-DC generator 200 is given in FIG. 2, where the engine 201 is the prime mover and source of rotational energy. The synchronous machine 202 converts rotational speed to AC voltage (torque to AC current) and the rotating mass is inertial stored energy that can be converted to AC voltage. The passive rectifier 203 converts AC to unregulated DC voltage. The DC/DC converter 204 provides active conversion to a regulated DC bus 205. The reduced order DC source model assumptions include: a) the engine and machine fast dynamics are ignored, b) the engine slow dynamics are captured by $v_s$ (source), c) the spinning inertia energy dynamics are captured by $u_s$ (storage), d) the impedance dynamics are lumped into the DC line, and e) the DC/DC converter ignores the switching dynamics and uses only the average mode (slow dynamics). The simplified model is represented as the circuit diagram at the far left in FIGS. 3 and 4B, respectively. ii) The battery and DC/DC converter are modeled as a DC current injection storage device. iii) The DC/AC inverter is modeled as a lossless power balance between DC and DQ. A standard DC/AC model employs six switches (FET or IGBT) to convert DC voltages to regulated three-phase AC. Switching PWM signals generate three-phase voltage output. See T. Hassell et al., *Modeling of Inverter Based AC Microgrids for Control Development*, IEEE MSC Conference, Sydney, Australia, Sep. 20-22, 2015. The reduced order inverter model assumptions include: a) the switching is fast and lossless (negligible) and the DC power equals the AC power which uses dependent sources to balance power. b) the three-phase AC has a synchronous reference frame. See T. Hassell et al., *Modeling of Inverter Based AC Microgrids for Control Development*, IEEE MSC Conference, Sydney, Australia, Sep. 20-22, 2015. This includes: 1) the frequency is fixed, 2) a-b-c phases can be directly converted to two-phase (DC like) DQ reference frame, and 3) three-phase line impedance can be directly converted into DQ model (including current dependent voltage sources). Finally, iv) the lines of the AC ring-bus are sufficiently short to ignore line dynamics and model the ring as a single AC bus.

Figure 3:
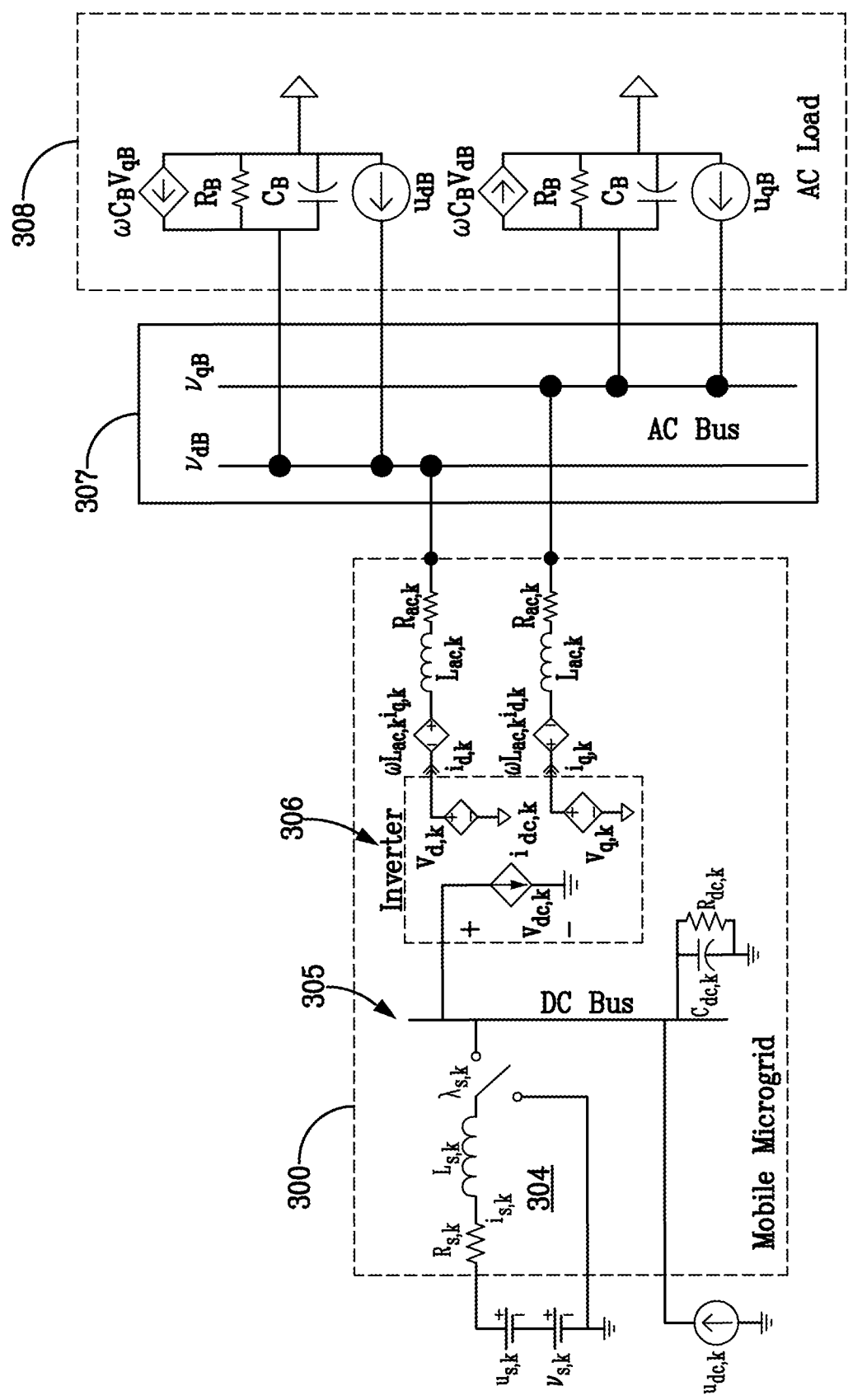
FIG. 3 is an illustration of a generalized single DC microgrid module k.

The fundamental DC microgrid model shown in FIG. 1 can be generalized by introducing a single DC microgrid module k as shown in FIG. 3. The exemplary model comprises a single DC microgrid 300. The DC microgrid 300 comprises a DC power source $v_{s,k}$ and a storage device $u_{s,k}$, a boost converter 304 to boost the output of the DC power source $v_{s,k}$ and the storage device $u_{s,k}$ to feed a DC bus 305 by way of switch $2s,k$, and an AC inverter 306 to invert the output of the DC bus 305 to AC. An energy storage source $u_{dc,k}$ can also connected to the DC bus 305 to support variations in the load. As described above, an AC inverter 306 inverts the DC input $v_{dc,k}$ from the DC bus 305 to AC. The AC output of the microgrid 300 ties into an AC bus 307, which in turn provides power to an AC load 308. Energy storage sources $u_{dB}$, $u_{qB}$ can also be connected to the AC bus 307 to inject power onto the AC bus 307 to support variations in the AC load 308.

This fundamental building block can be used to build a large number of DC microgrid systems (k=1, ..., N) that tie into an AC ring bus. In the example described below, three DC microgrids (k=3) tie into an AC ring bus. This model can also serve to represent a single AC/DC microgrid ROM system.

Figure 4A:
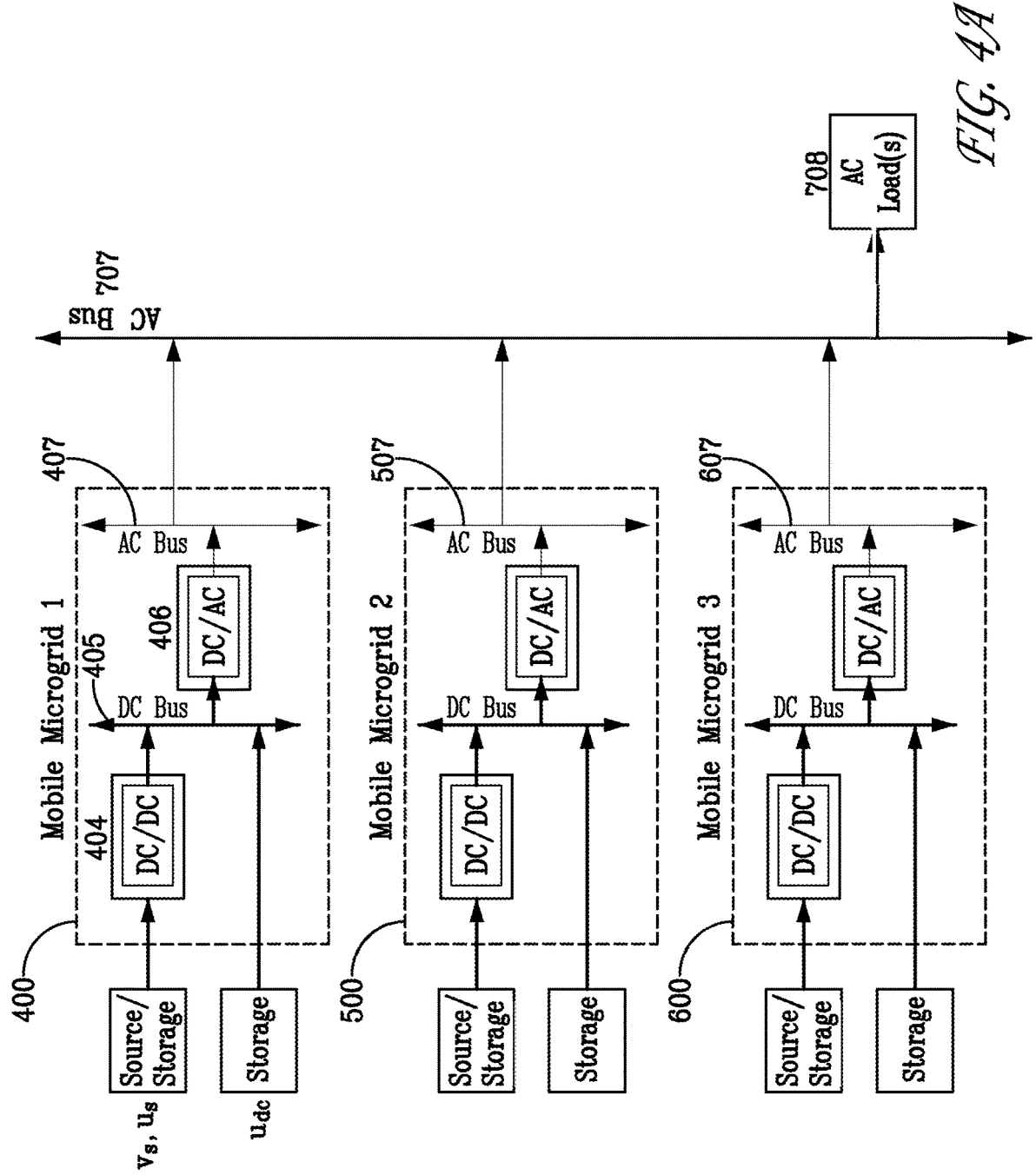
FIG. 4A is a high level functional diagram for a Reduced Order Model (ROM) networked microgrid system.

A high-level functional diagram for the networked three DC microgrid system is shown in FIG. 4A. For each microgrid 400, a DC voltage source $v_s$ and energy storage voltage source $u_s$ are coupled to a DC bus 405 via a boost converter 404. An energy storage source $u_{dc}$ can also be connected to the DC bus 405 to support variations in the load. A DC/AC inverter 406 inverts the DC input from the DC bus 405 to an AC output, which then ties into an AC bus 407. The AC bus 407 from DC microgrid 400 combines with AC buses 507, 607 from the other DC microgrids 500, 600 to feed a networked AC bus 707 which in turn provides power to an AC load 708.

Figure 4B:
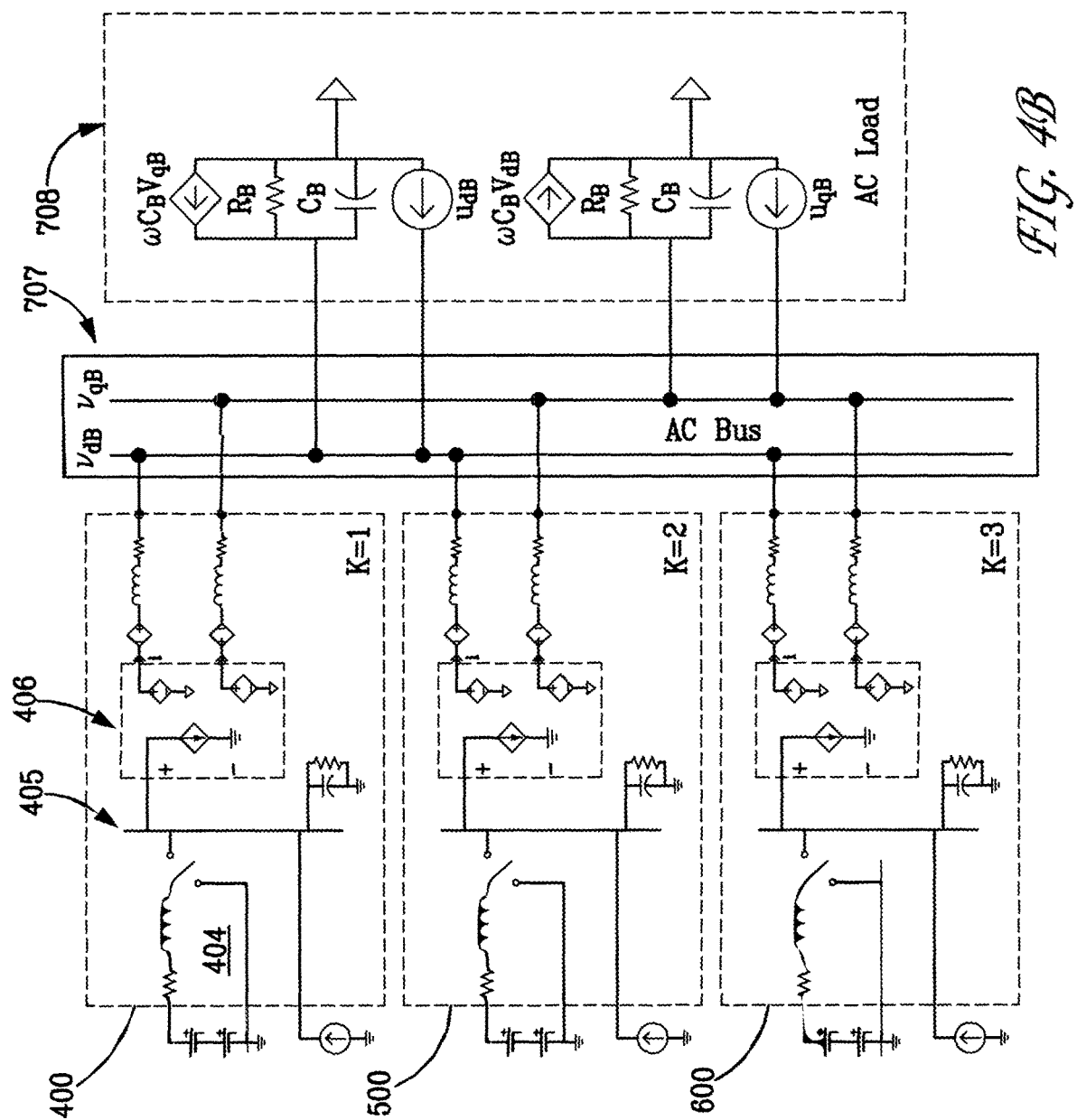
FIG. 4B is an illustration of a model of a networked microgrid system

A detailed schematic for the networked three DC microgrid system is shown in FIG. 4B. The system model for the microgrid DC and AC converters is $$L_{s,k}\frac{di_{s,k}}{dt} = -\lambda_{s,k}v_{dc,k} - R_{s,k}i_{s,k} + u_{s,k} + v_{s,k} \tag{5}$$

$$C_{dc,k}\frac{dv_{dc,k}}{dt} = -i_{dc,k} - \frac{v_{dc,k}}{R_{dc,k}} + u_{dc,k} + \lambda_{s,k}i_{s,k}$$

$$L_{ac,k}\frac{di_{d,k}}{dt} = -R_{ac,k}i_{d,k} + \omega L_{ac,k}i_{q,k} + v_{d,k} - v_{dB}$$

$$L_{ac,k}\frac{di_{q,k}}{dt} = -\omega L_{ac,k}i_{d,k} - R_{ac,k}i_{q,k} + v_{q,k} - v_{qB}$$

where $u_{s,k}$ is a model of a storage device on the AC generator connection and $u_{dc,k}$ is the equivalent current injection from the battery storage device.

The inverter model control is given as $$u_{d,k}=\beta\lambda_{dc,k}u_{dc,k}c(\phi_{dc,k})$$

$$u_{d,k}=\beta\lambda_{dc,k}u_{dc,k}s(\phi_{dc,k}) \tag{6}$$

where $\lambda_{dc,k}$ is the inverter control variable of the AC voltage magnitude, $\phi_{dc,k}$ is the inverter control variable of the AC voltage phase, $$\beta = \frac{1}{2}\sqrt{\frac{3}{2}},$$

c=cos, and s=sin.

The DC current into the inverter is $$i_{dc,k}=\beta\lambda_{dc,k}[c(\phi_{dc,k})i_{d,k}+s(\phi_{dc,k})i_{q,k}] \tag{7}$$

Substituting the control back into the system model yields $$L_{s,k}\frac{di_{s,k}}{dt} = -\lambda_{s,k}v_{dc,k} - R_{s,k}i_{s,k} + u_{s,k} + v_{s,k} \tag{8}$$

$$C_{dc,k}\frac{dv_{dc,k}}{dt} = \tag{9}$$

$$-\beta\lambda_{dc,k}[c(\phi_{dc,k})i_{d,k} + s(\phi_{dc,k})i_{q,k}] - \frac{v_{dc,k}}{R_{dc,k}} + u_{dc,k} + \lambda_{s,k}i_{s,k}$$

$$L_{ac,k}\frac{di_{d,k}}{dt} = -R_{ac,k}i_{d,k} + \omega L_{ac,k}i_{q,k} + v_{d,k} - v_{dB} \tag{10}$$

$$L_{ac,k}\frac{di_{q,k}}{dt} = -\omega L_{ac,k}i_{d,k} - R_{ac,k}i_{q,k} + v_{q,k} - v_{qB} \tag{11}$$

along with the AC bus model determined as $$C_B\frac{dv_{dB}}{dt} = \Sigma_d i_{d,k} + \omega C_B v_{qB} - \frac{v_{dB}}{R_B} + v_{dB} \tag{12}$$

$$C_B\frac{dv_{qB}}{dt} = \Sigma_q i_{q,k} - \omega C_B v_{dB} - \frac{v_{qB}}{R_B} + v_{qB}$$

The reduced order model is defined in matrix form as $$M\dot{x} = Rx + D^T v + B^T u \tag{13}$$

$$= [\bar{R} + \tilde{R}]x + D^T v + B^T u$$

where $R=\bar{R}+\tilde{R}$ is composed of symmetric and skew-symmetric matrices, respectively, u represents the ideal energy storage of the system, and v represents renewable or fossil fuel energy sources.

The states, controls, and input vectors are defined as $$x = [i_{sj}\ v_{dcj}\ i_{dj}\ i_{qj}\ v_{dB}\ v_{qb}]^T \quad (14)$$
$$j = 1 \ldots 3$$
$$u = [u_{s1}\ u_{s2}\ u_{s3}\ u_{dc1}\ u_{dc2}\ u_{dc3}\ d_{dB}\ u_{qB}]^T$$
$$v = [v_{s1}\ v_{s2}\ v_{s3}]^T.$$

HSSPFC Control for AC/DC Microgrid System

The goal of the HSSPFC control design is to define static and dynamic stability criteria for an AC/DC microgrid system. The controller consists of both feedforward and feedback portions. For the feedforward or guidance algorithm, two possible options can be considered: i) a dynamic optimization formulation can be developed in general to accommodate a large number of generation, loads, busses, and energy storage resources (see D. G. Wilson et al., *Nonlinear Power Flow Control Design of High Penetration Renewable Sources for AC Inverter Based Microgrids*, in IEEE International Symposium on Power Electronics, Electrical Drives, Automation and Motion, SPEEDAM, Jun. 22-24, 2016, AnaCapri, Italy; and J. Young, *Optizelle: An open source software library designed to solve general purpose nonlinear optimization problems*, 2014, www.optimojoe.com, Open source software) or ii) a simple steady-state solution to Eq. (13) can be solved (for a DC microgrid system, see D. G. Wilson et al., *Renewable Energy Microgrid Control with Energy Storage Integration*, International Symposium on Power Electronics, Electrical Drives, Automation and Motion, SPEEDAM, Jun. 20-22, 2012, Sorrento, Italy). The basis of dynamic optimization is to formulate the problem in terms of an optimal control problem. See J. Young, *Optizelle: An open source software library designed to solve general purpose nonlinear optimization problems*, 2014, www.optimojoe.com, Open source software. In general, there are three overall goals: reduce the change in the inverter duty cycles, reduce reliance on the energy storage devices, and reduce parasitic losses. The AC inverter circuit and bus equations can be expanded to include larger orders and combinations of each. Thus, the goal is to minimize an appropriate objective function (or performance index, PI). The description below will focus on the second option (i.e., a simplified steady-state solution).

Feedforward Control Based on Steady-State Solution

The feedforward control is based on a balanced power flow $$x_R^T[M\dot{x}_R - (\overline{R}+\tilde{R})x_R - D^Tv - B^Tu_R] = 0 \quad (15)$$

for which the reference state becomes $$M\dot{x}_R = (\overline{R}+\tilde{R})x_R + D^Tv + B^Tu_R. \quad (16)$$

Note the skew-symmetric condition $x_R^T\tilde{R}x_R = 0$. For steady-state operation and generating set points, the following equation can be solved for reference states $x_R$, duty cycles $\lambda$, angles $\phi$, and with a specified frequency $\omega$ as $$0 = Rx_R + D^Tv + B^Tu_R. \quad (17)$$

An illustrative methodology for a single AC ring bus, the following assumptions are made; i) reference states $x_{13_R} = u_{db}$ and $x_{14_R} = u_{qB}$ are specified and for balanced power flow the control $u_R = 0$.

The first step is to determine the necessary network currents as $$I_{d_{total}} = \Sigma_{k=1}^N i_{d,k} = \left[\frac{v_{dB}}{R_B} - \omega C_B v_{qB}\right] \quad (18)$$
$$I_{q_{total}} = \Sigma_{k=1}^N i_{q,k} = \left[\frac{v_{qB}}{R_B} + \omega C_B v_{dB}\right].$$

By introducing the power proportionment term $\alpha_k$ then $$i_{d,k} = \alpha_k I_{d_{total}}\ \forall k=1,2,3$$
$$i_{q,k} = \alpha_k I_{q_{total}}\ \forall k=1,2,3 \quad (19)$$

where $\Sigma_k\ \alpha = 1$.

In step two, the phase angles $\phi_{dc,k}$ are determined for each microgrid k as $$\tan\phi_{dc,k} = \frac{\omega L_{AC,k} i_{d,k} + R_{AC,k} i_{q,k} + v_{qB}}{R_{AC,k} i_{d,k} - \omega L_{AC,k} i_{q,k} + v_{dB}} \quad (20)$$
$$y_{dc,k} = \omega L_{AC,k} i_{d,k} + R_{AC,k} i_{q,k} + v_{qB}$$
$$x_{dc,k} = R_{AC,k} i_{d,k} - \omega L_{AC,k} i_{q,k} + v_{dB}$$
$$\phi_{dc,k} = \text{TAN2}(y_{dc,k}, x_{dc,k}).$$

In final step three, the steady state algebraic nonlinear equation F(x) is solved for each individual microgrid k. F(x) contains four states given as $$x = [\lambda_{s,k} \lambda_{dc,k} i_{s,k} u_{dc,k}]^T = [x_1 x_2 x_3 x_4]^T \quad (21)$$

and the nonlinear equations coupled in the states are given as $$F_1(x) = -x_1 x_4 - R_{s,k} x_3 + v_{s,k} \quad (22)$$
$$F_2(x) = -\beta(c\phi_{dc,k} i_{d,k} + s\phi_{dc,k} i_{q,k})x_2 - \frac{1}{R_{dc,k}}x_4 + x_1 x_3$$
$$F_3(x) = -R_{AC,k} i_{d,k} + \omega L_{AC,k} i_{q,k} + \beta c\phi_{dc,k} x_2 x_4 - v_{dB}$$
$$F_4(x) = -\omega L_{AC,k} i_{d,k} - R_{AC,k} i_{q,k} + \beta s\phi_{dc,k} x_2 x_4 - v_{qB}$$
$$F(x) = [F_1\ F_2\ F_3\ F_4]^T.$$

The matlab optimization function fsolve can be called to determine F(x) every feedforward time step $\tau_{ff}$ update or $$x = f\text{solve}(F(x), x_0)$$

where $x_0$ is the initial condition for each microgrid k that is used iteratively as the starting condition for each new update. For this specific implementation, the OPTI toolbox opti_fsolve function employed by Currie was used. See J. Currie, OPTI Toolbox, A Free MATLAB Toolbox for Optimization, invP, December 2016.

Feedback Control

The feedback control design begins with the definition of the error states. The AC/DC microgrid system error state and control inputs are defined as $\tilde{x} = x_R - x = e$ and $\tilde{u} = u_R - u = \Delta u$. The feedback control is selected as a proportional-integral (PI) control $$\Delta u = -K_P B\tilde{x} - K_I B \int_0^t \tilde{x} d\tau \quad (23)$$

where $K_P$ and $K_I$ are positive definite controller gains. The energy surface or Hamiltonian for the system is determined as the sum of kinetic and potential energies or $$\mathcal{H} = \tfrac{1}{2}\tilde{x}^T M \tilde{x} + \tfrac{1}{2}[\int_0^t \tilde{x} d\tau]^T B^T K_I B [\int_0^t \tilde{x} d\tau] \forall \tilde{x} \neq 0 \quad (24)$$

which is a positive definite function and defines the AC/DC microgrid static stability condition. The integral controller gain, $K_I$, provides additional control potential energy to further shape or design the energy surface to meet the static stability condition. The transient performance is determined from the power flow or Hamiltonian rate $$\dot{\mathcal{H}} = \tilde{x}^T [M(\dot{x}_R - \dot{x})] + \tilde{x}^T B^T K_I B [\int_0^t \tilde{x} d\tau]. \quad (25)$$

Substituting for both the reference $\dot{x}_R$ and $\dot{x}$ from Eqns (16), (13), and simplifying terms yields the dynamic stability condition $$-\tilde{x}^T [B^T K_P B - \tilde{R}] \tilde{x} < 0 \; \forall \tilde{x} \neq 0. \quad (26)$$

Selection of the proportional controller gain, $K_P$, determines the transient performance for the AC/DC microgrid system along the Hamiltonian energy surface.

Numerical Simulations

The AC/DC microgrid system model and control was tested and verified with a renewable energy scenario. This scenario included both feedforward/feedback with varying load and one varying generator input. The AC/DC microgrid networked model and control analysis was performed in a Matlab/Simulink environment.

Figure 5:
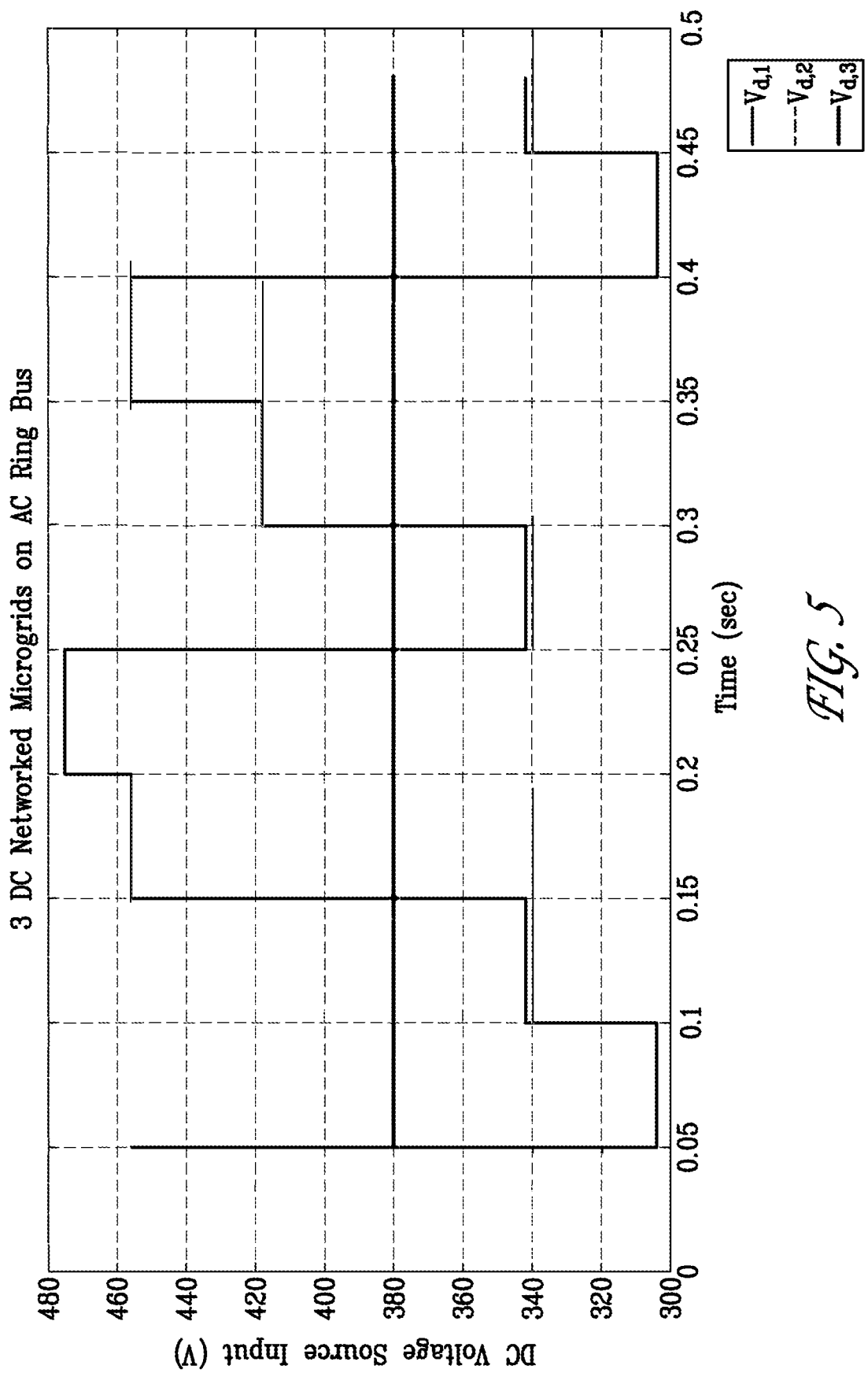
FIG. 5 is a graph of the variable generator input for microgrid 1 and constant generator input for microgrids 2 and 3.
Figure 6:
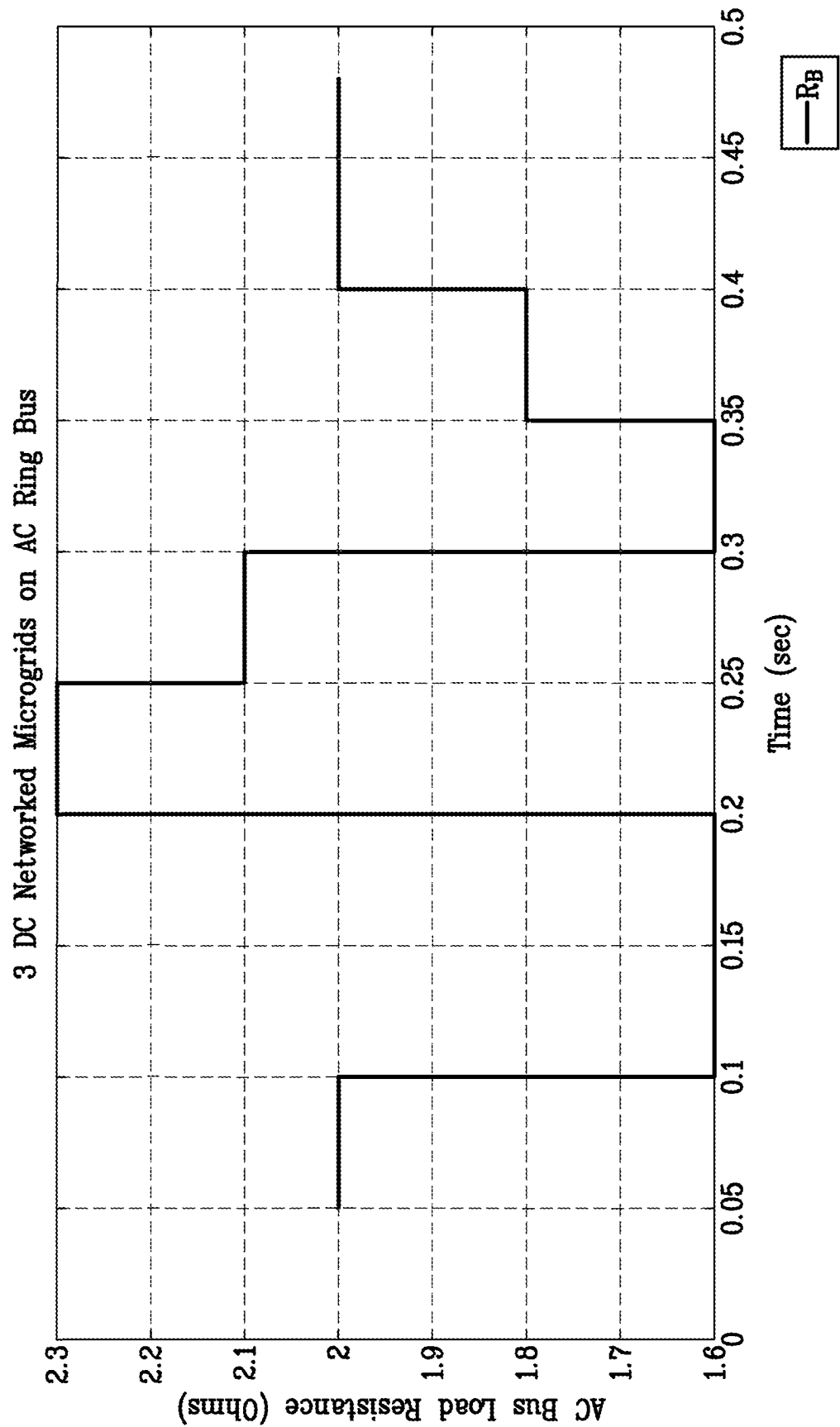
FIG. 6 is a graph of the variable resistive load on AC ring bus.
Figure 7:
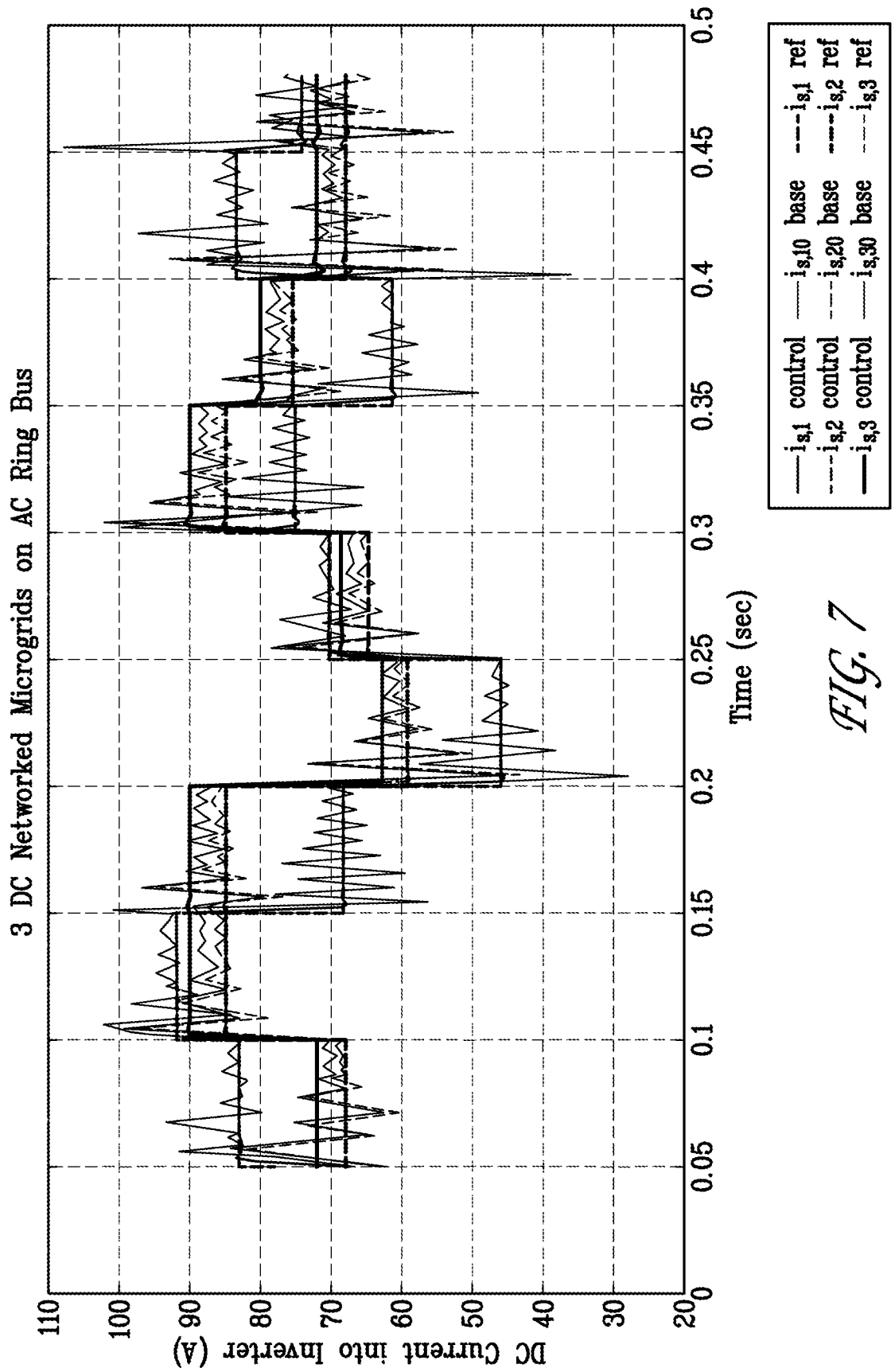
FIG. 7 is a graph of the DC current into the inverter with and without controls for microgrid k.
Figure 8:
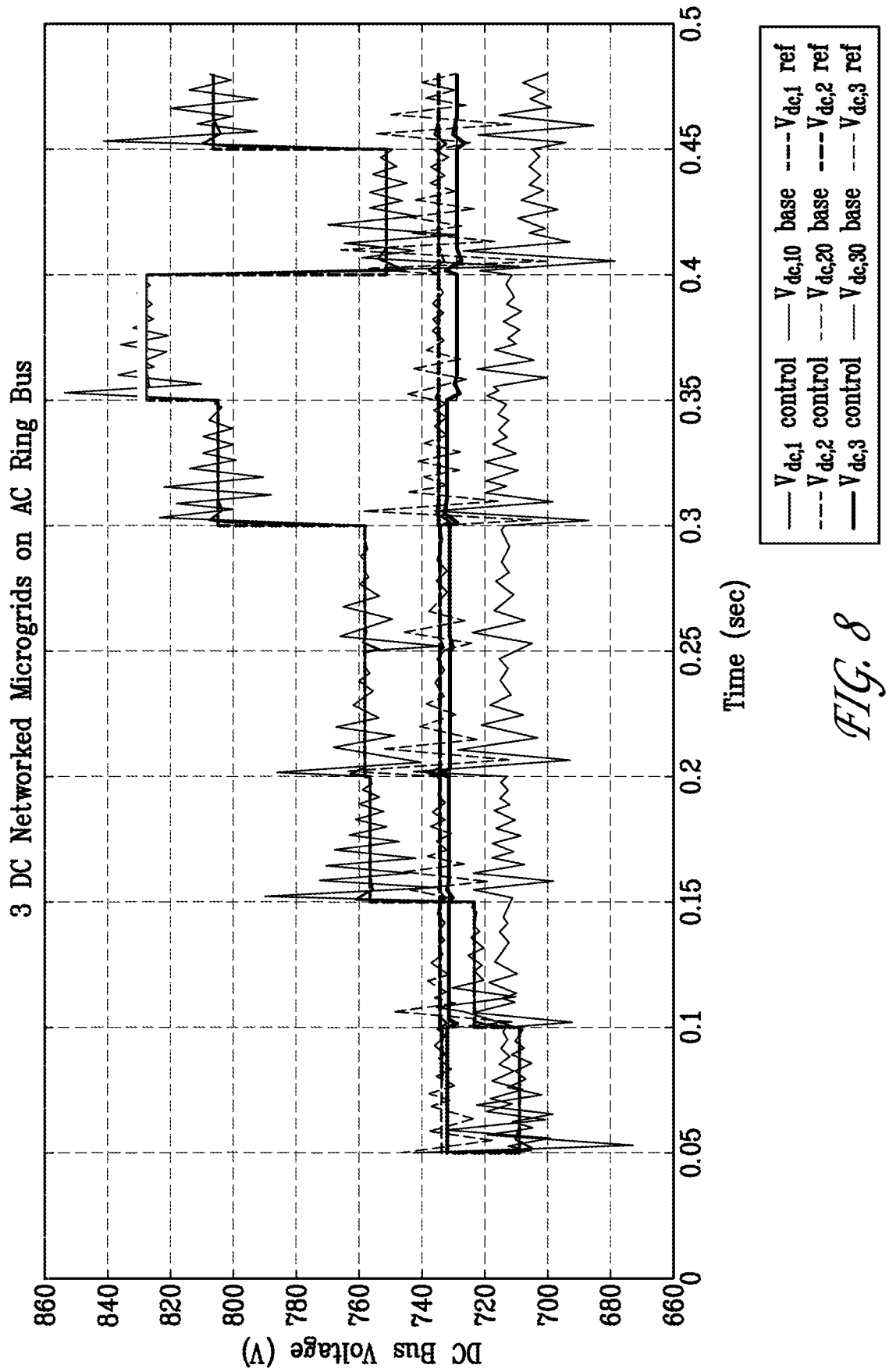
FIG. 8 is a graph of DC bus voltages with and without controls for microgrid k.
Figure 9:
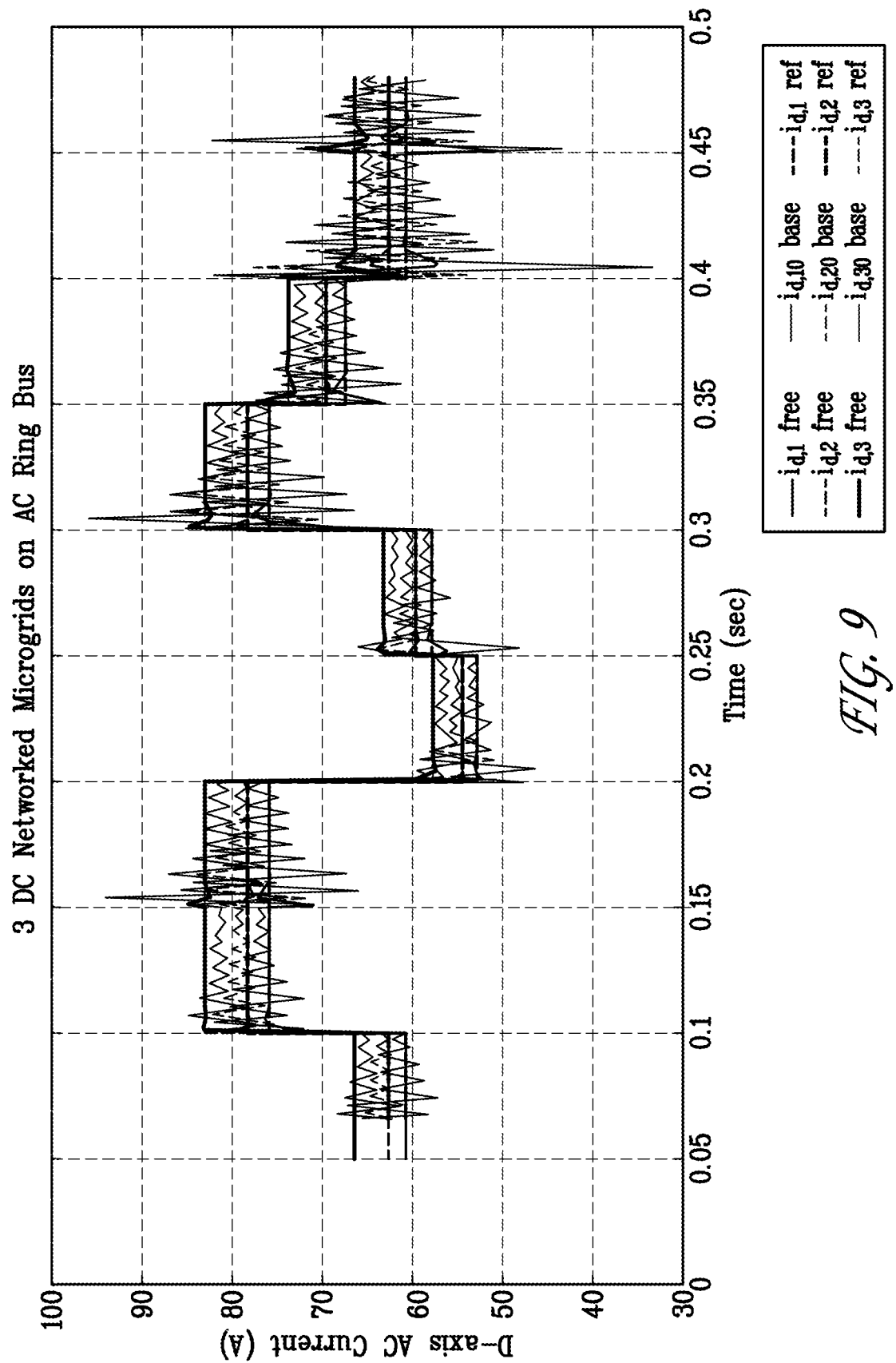
FIG. 9 is a graph of the D-axis current with and without controls for microgrid k.
Figure 10:
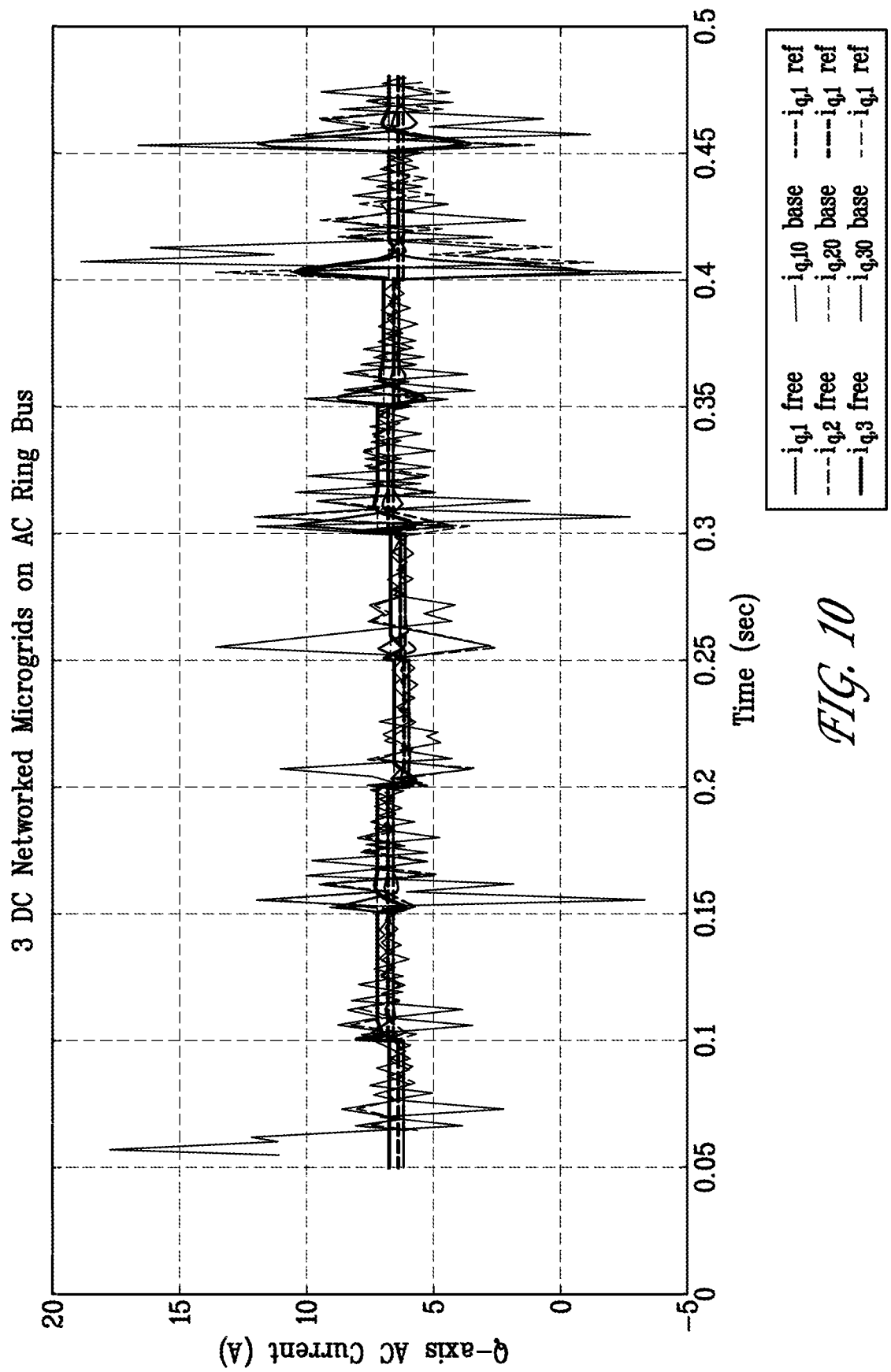
FIG. 10 is a graph of the Q-axis current with and without controls for microgrid k.
Figure 11:
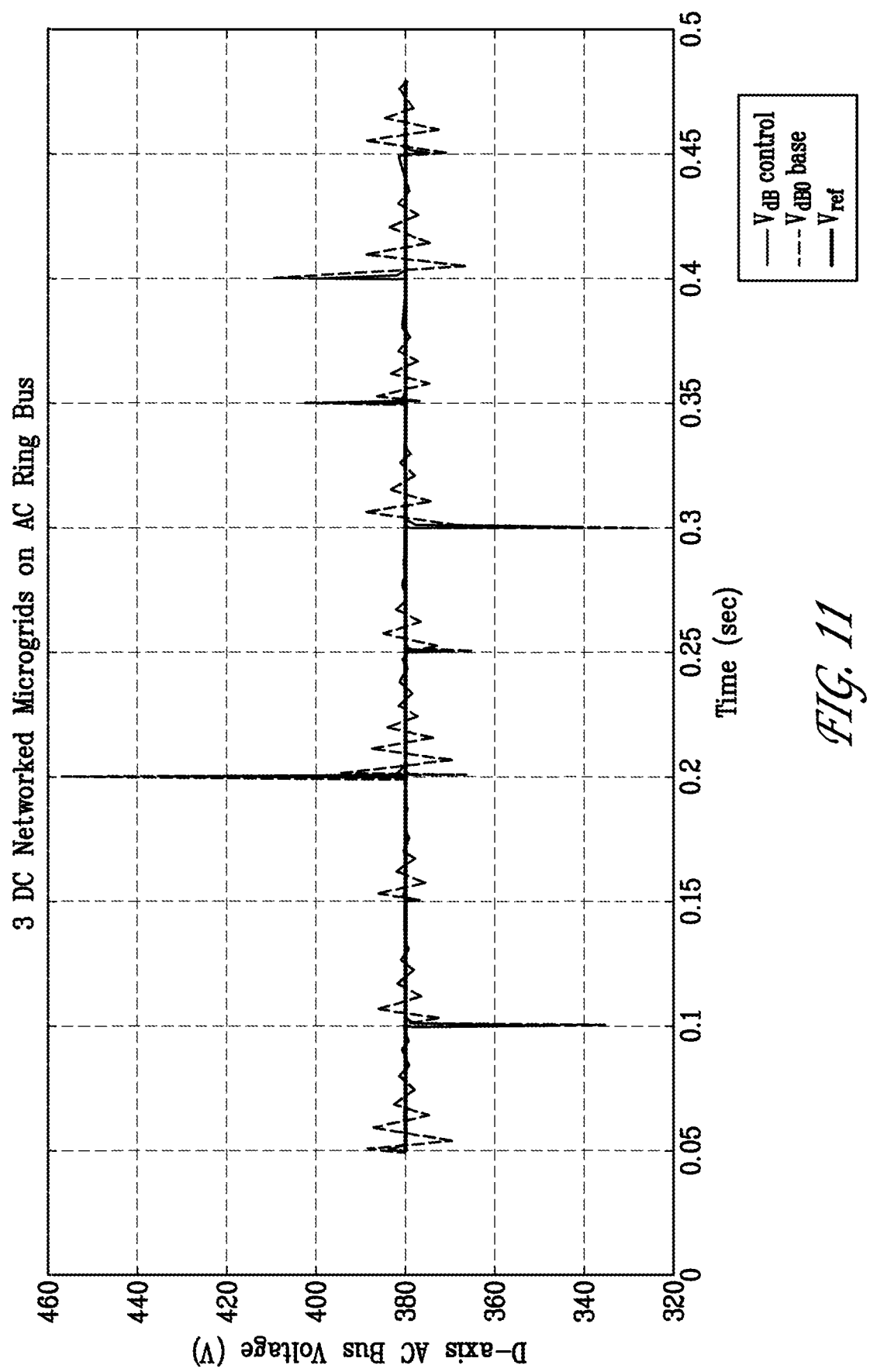
FIG. 11 is a graph of the D-axis voltage with and without controls for AC ring bus.
Figure 12:
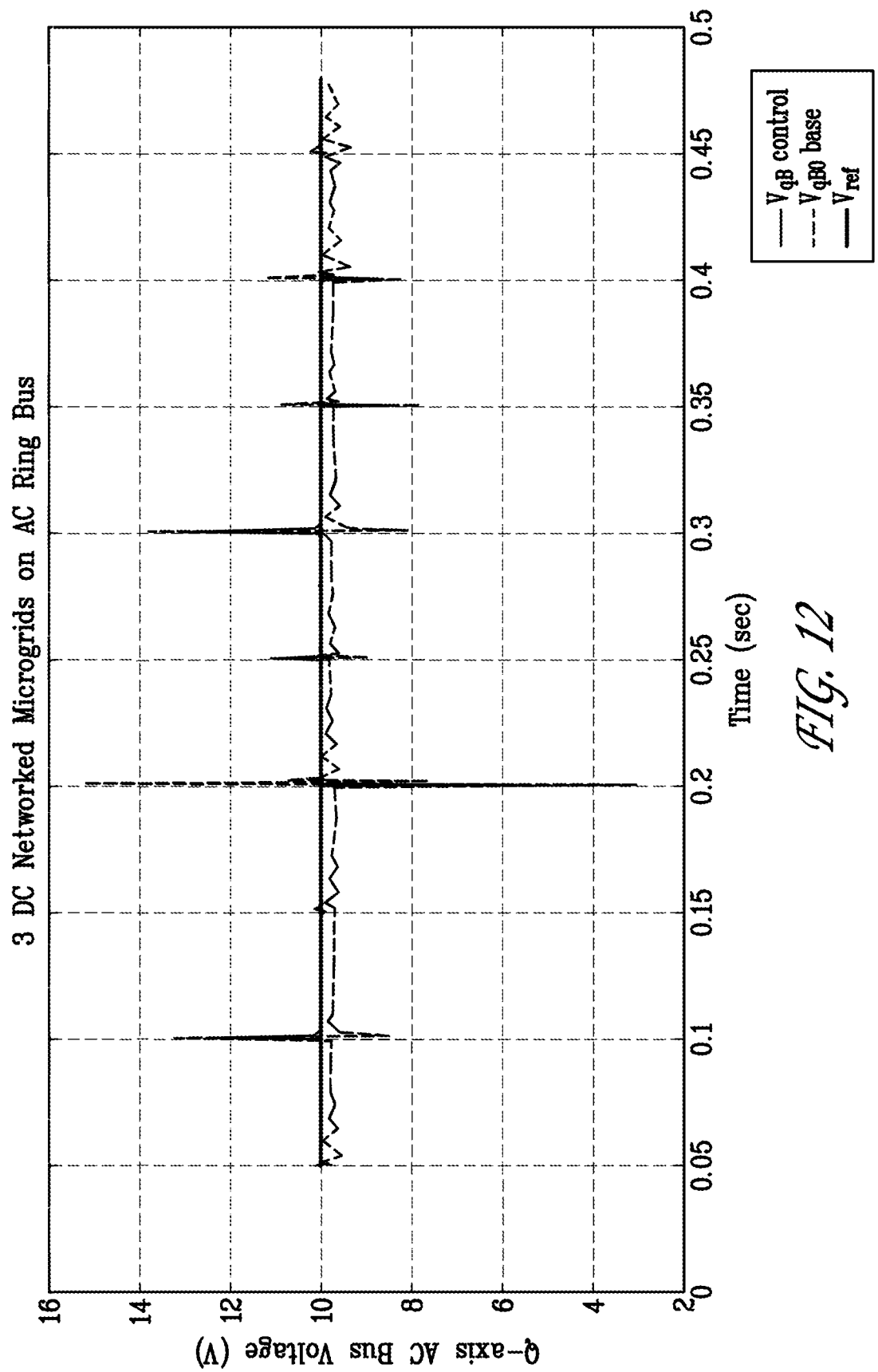
FIG. 12 is a graph of the Q-axis voltage with and without controls for AC ring bus.
Figure 13:
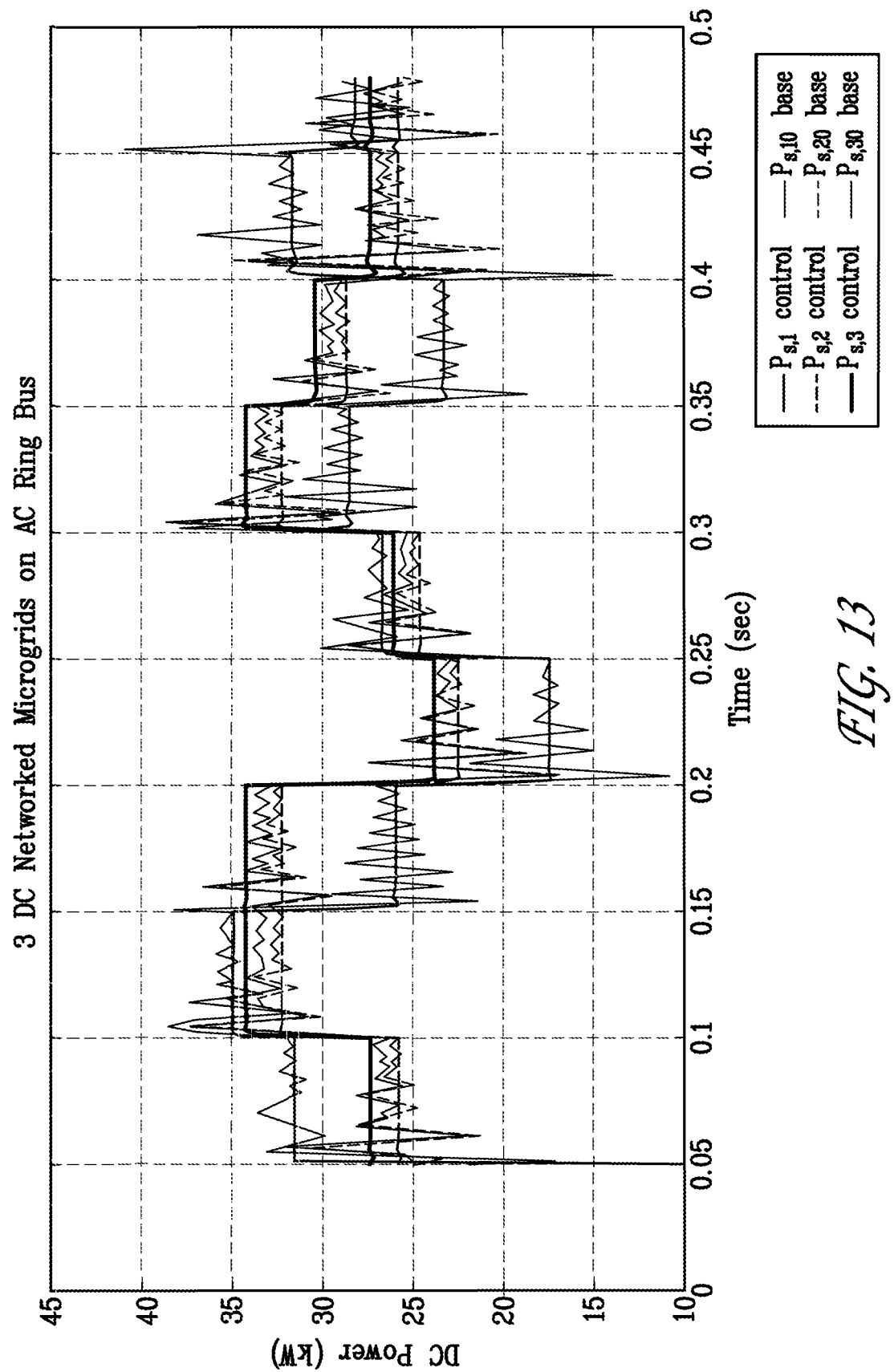
FIG. 13 is a graph of the DC power with and without controls for microgrid k.
Figure 14:
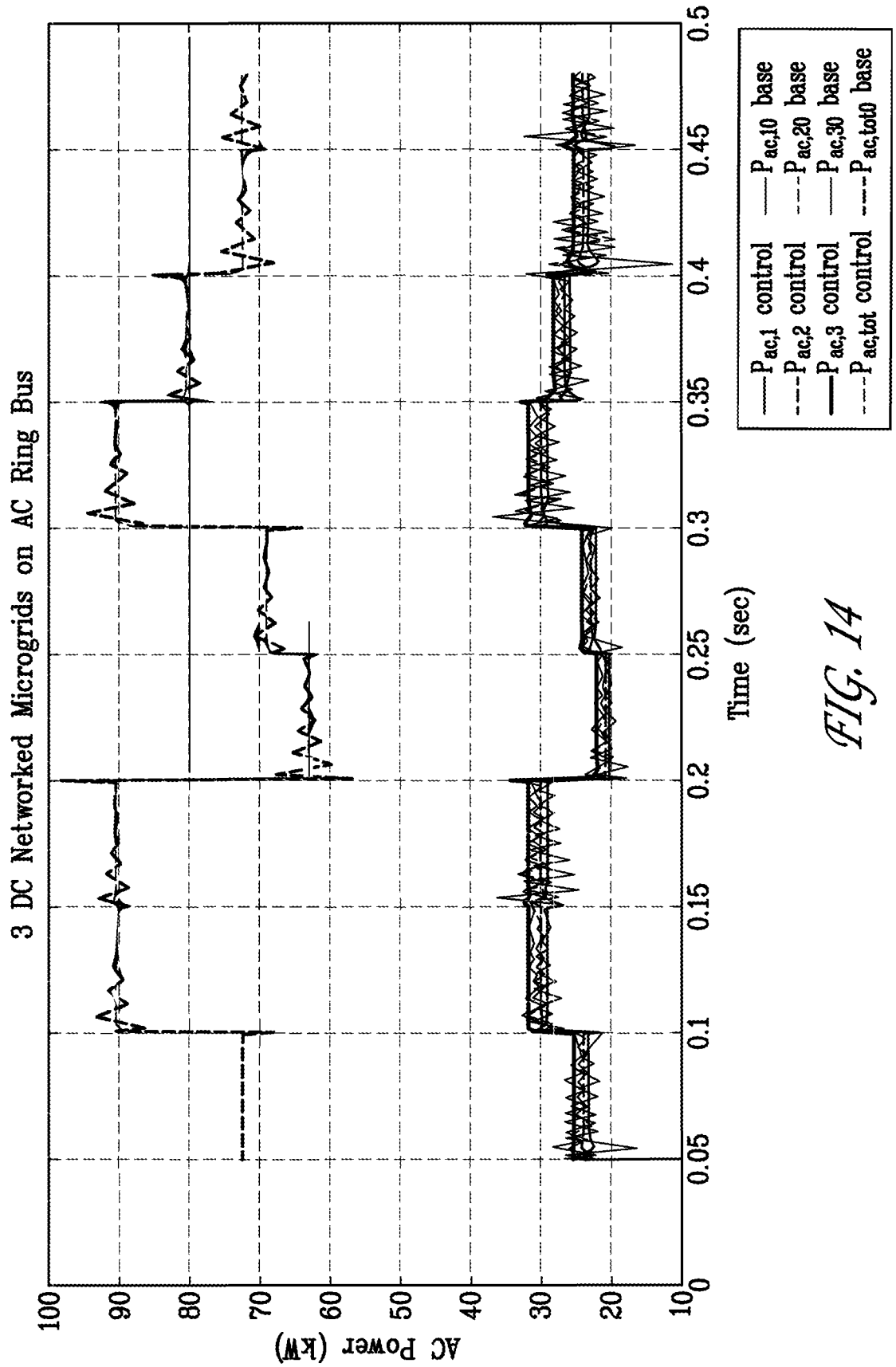
FIG. 14 is a graph of the AC power with and without controls for microgrid k.
Figure 15:
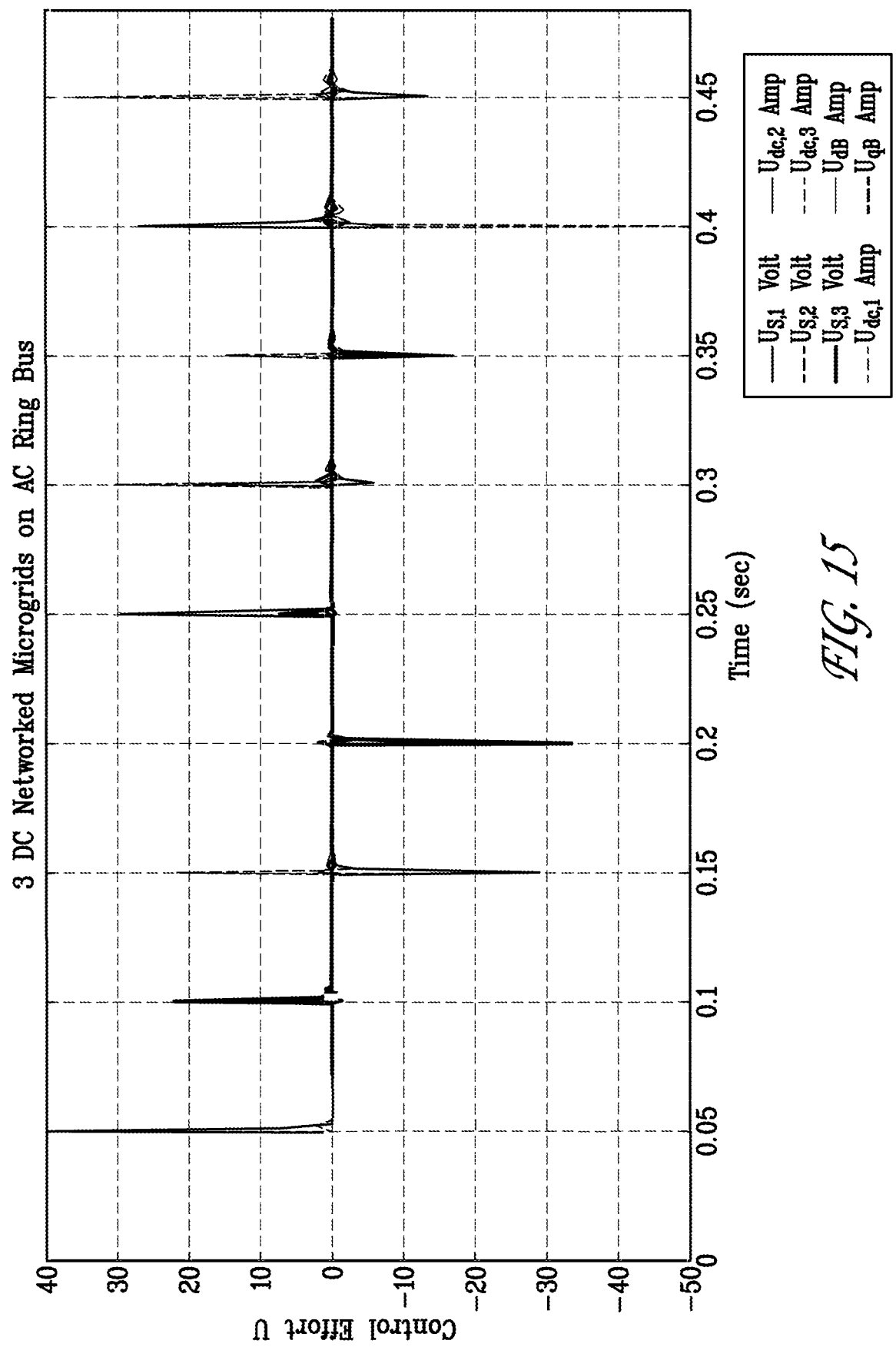
FIG. 15 is a graph of the control effort for microgrid k.
Figure 16:
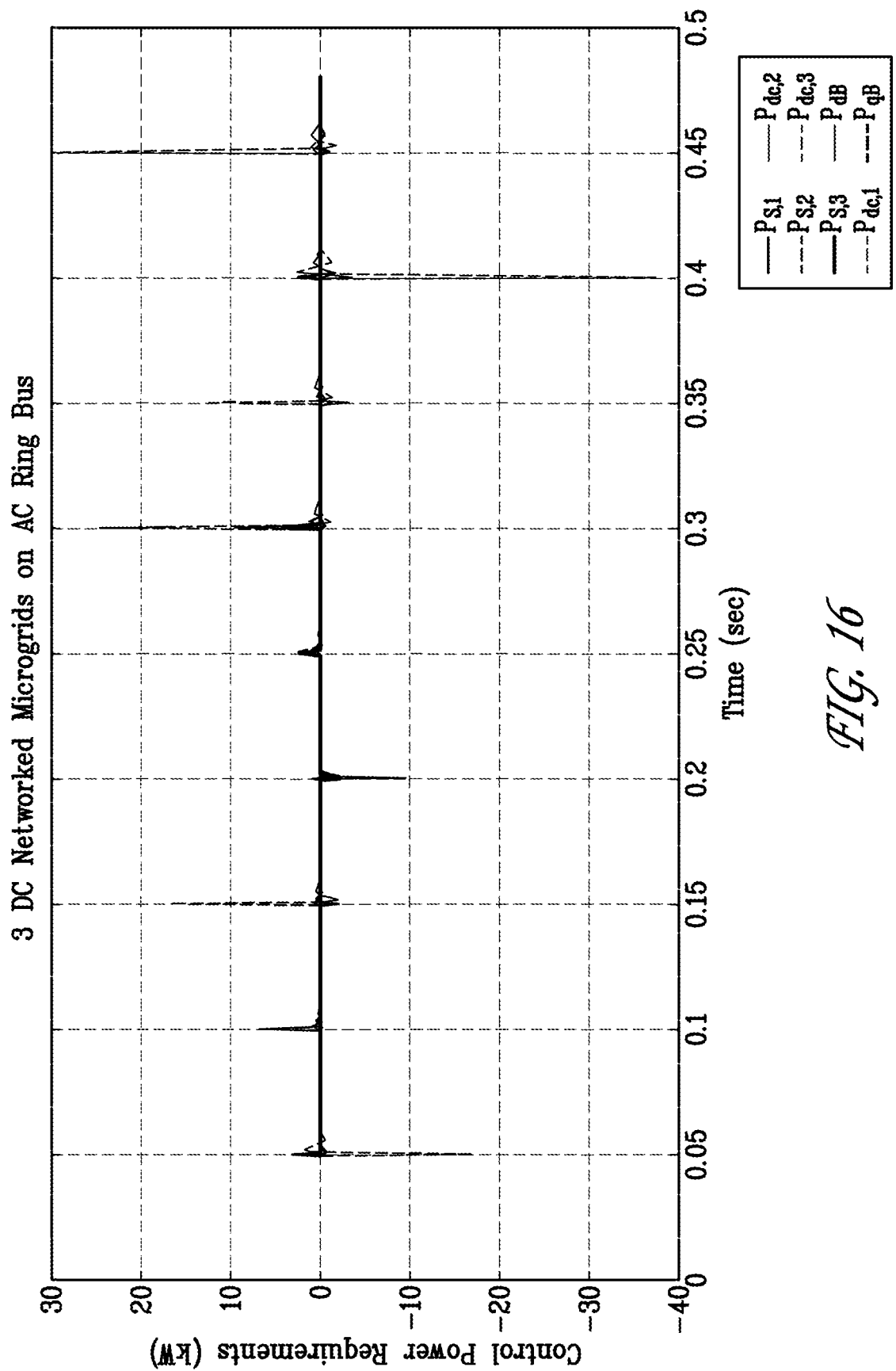
FIG. 16 is a graph of the control power requirements.
Figure 17:
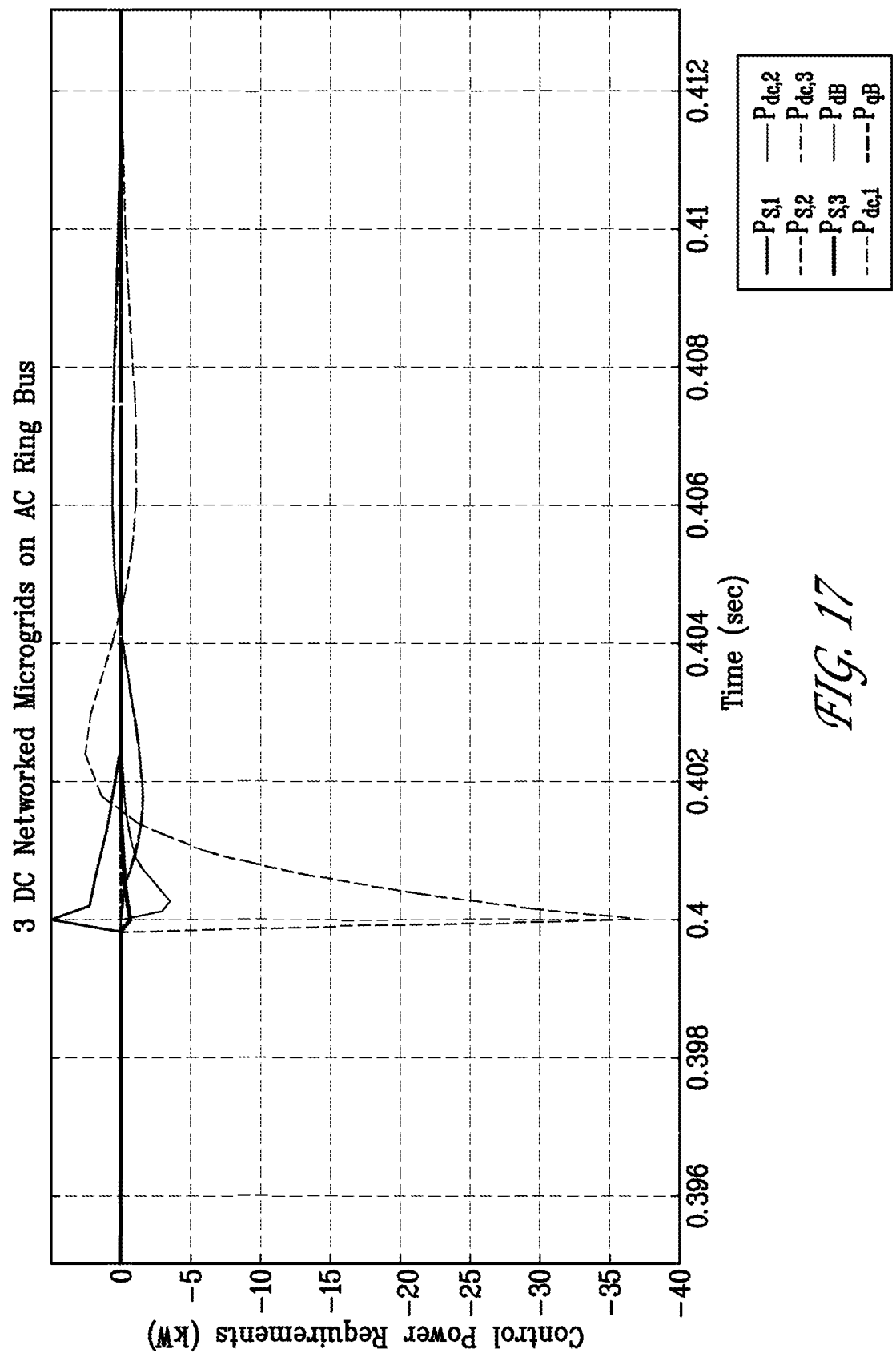
FIG. 17 is a graph of the control peak power requirement at 0.40 seconds.
Figure 18:
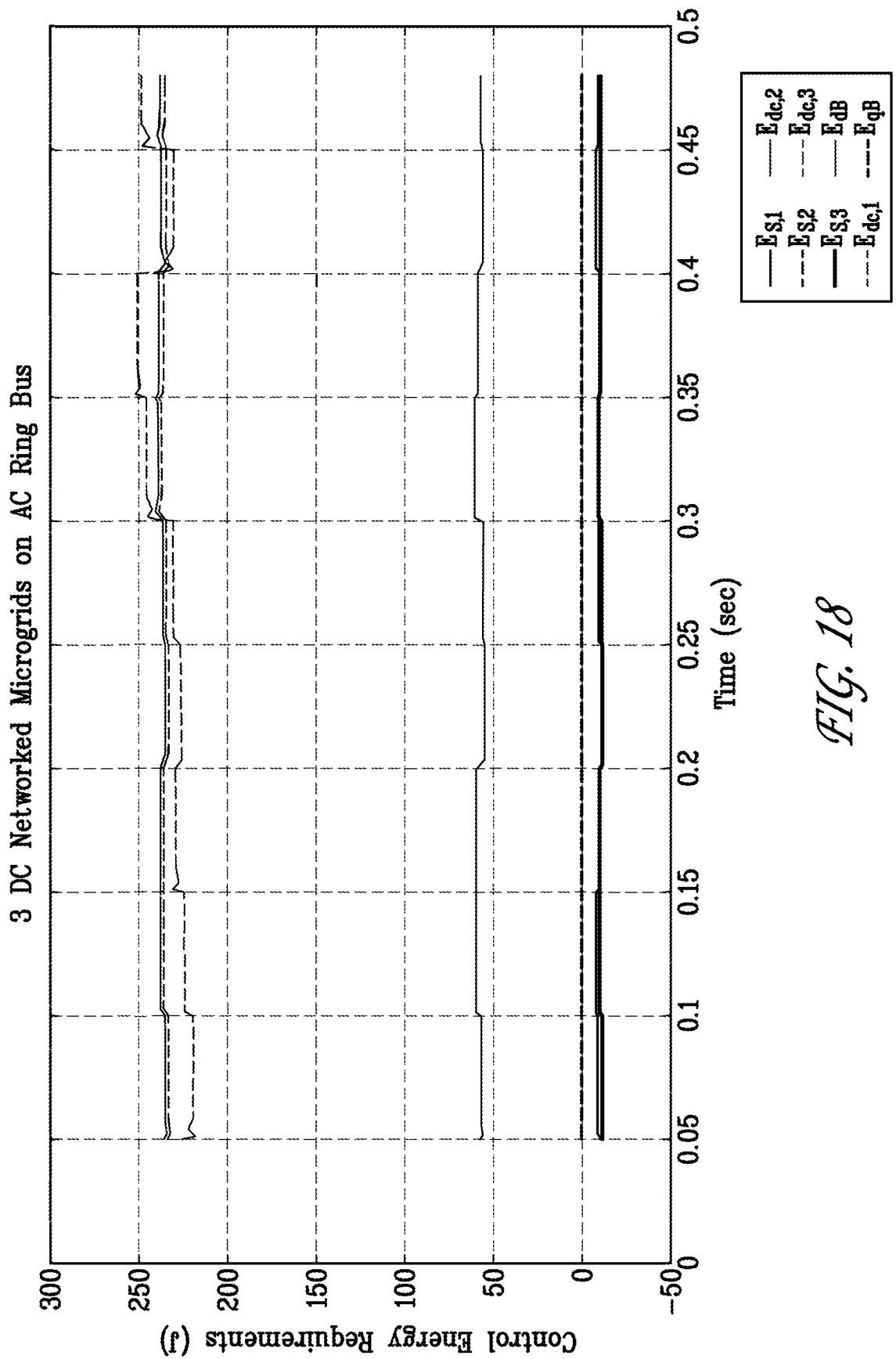
FIG. 18 is a graph of control energy requirements.
Figure 19:
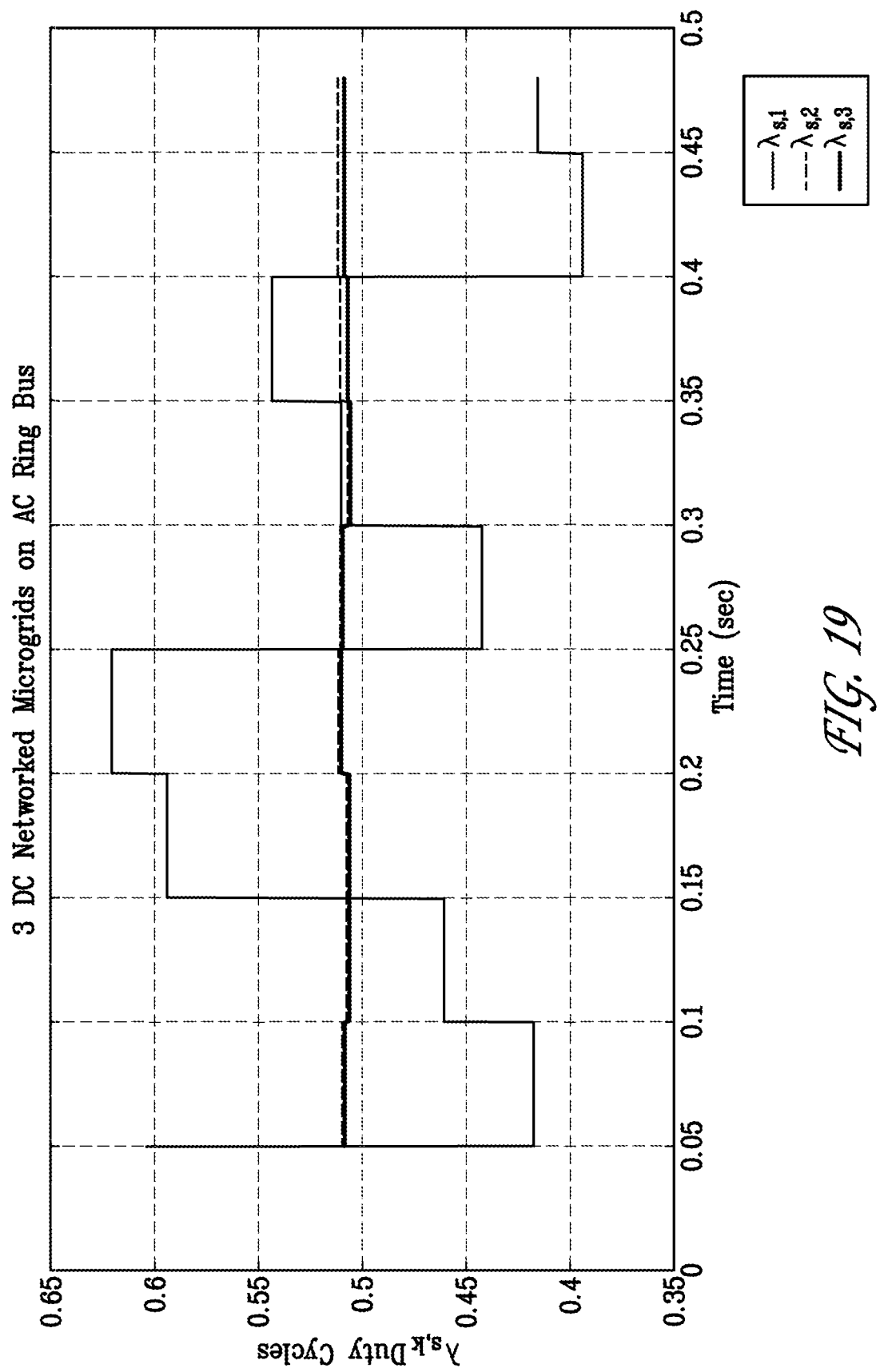
FIG. 19 is a graph of DC boost converter duty cycles for microgrid k.
Figure 20:
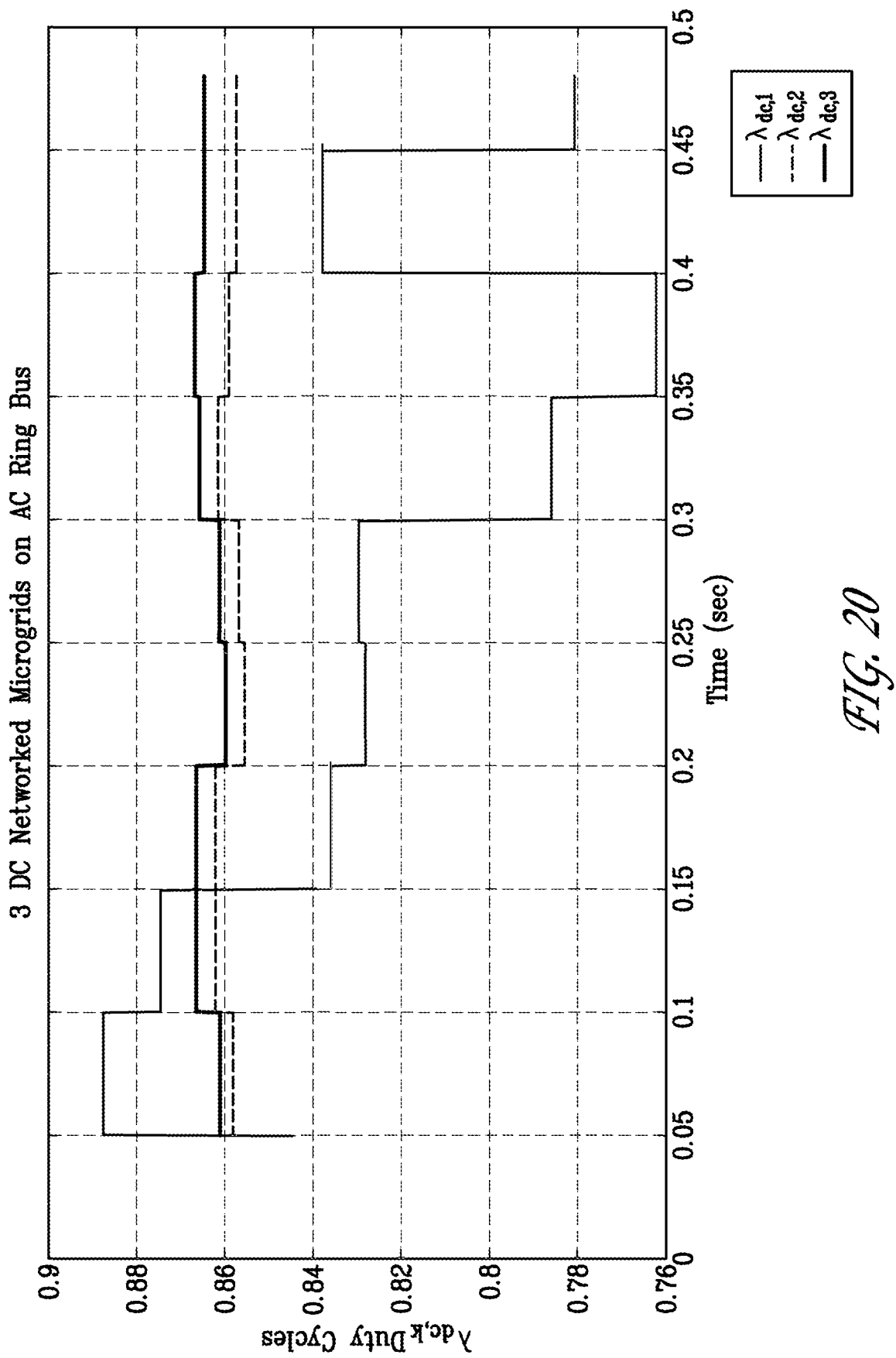
FIG. 20 is a graph of AC boost inverter duty cycles for microgrid k.
Figure 21:
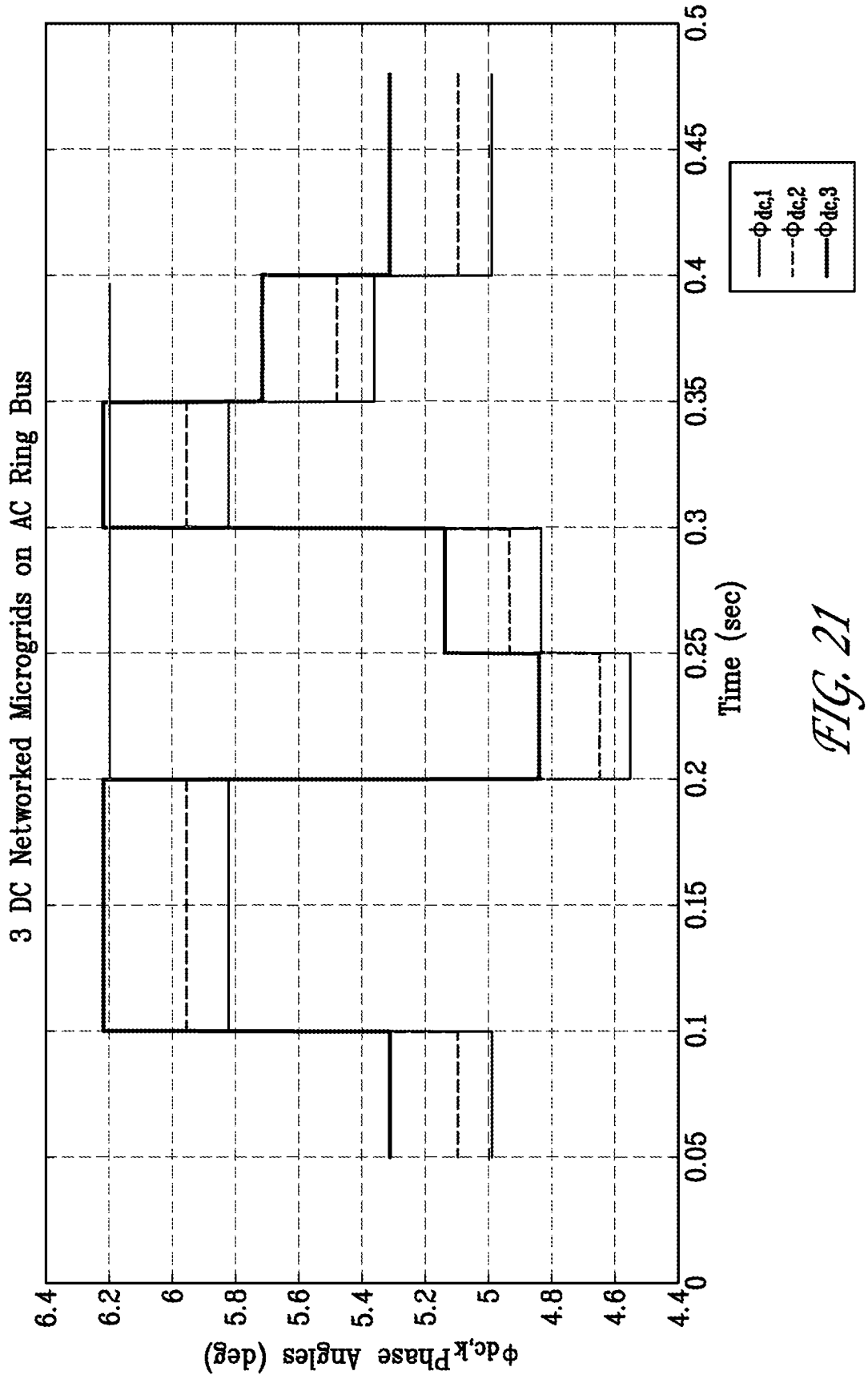
FIG. 21 is a graph of AC boost inverter phase angles for microgrid k.

The HSSPFC controller design from the previous section for both feedback and feedforward control was applied to the AC/DC microgrid networked model shown in FIG. 4B and investigated through numerical simulations. Now both the input generation (representative of one varying PV input and two constant diesel generators) are tested along with a varying load profile. These profiles are shown in FIG. 5 for the generator voltage input sources $v_{d,k}$ and in FIG. 6 for the varying load RB. The feedforward solution was updated as a function of the varying input source and load profiles (where $\tau_f = 0.05$ sec). The DC currents into the inverter with and without feedback control $i_{s,k}$ and $i_{s,10k}$ are shown in FIG. 7. The corresponding DC bus voltages $v_{dc,k}$ and $v_{dc,10k}$ are given in FIG. 8. Typical performance for DC bus voltage regulation is $V_{dcnominal} \pm 5\%$. The D-axis and Q-axis currents $i_{d,k}$, $i_{d,10k}$, $i_{q,k}$, and $i_{q,10k}$ along with voltages $v_{dB}$, $v_{dB0}$, $v_{qB}$, and $v_{qB0}$ are shown in FIGS. 9-12, respectively. Note there are not any current feedback controllers and these are considered open loop responses (free) for the D-axis and Q-axis currents. The transient performance is improved with the tuned feedback controllers. The DC power levels $P_{s,k}$ and $P_{s,10k}$ for each individual microgrid are given in FIG. 13 and are nominally on the order of 30 kW tactical microgrid design levels. Note the PV microgrid $P_{s,10}$ has a higher variation in power level than the diesel generators $P_{s,20}$ and $P_{s,30}$. Similar results on the AC power side $P_{ac,k}$ and $P_{ac,10k}$ are shown in FIG. 14 with the sum total for all three microgrids shown $P_{ac,tot}$ and $P_{ac,tot0}$ is on the order of 90 kW. The control efforts for all energy storage systems $U_{s,k}$, $U_{dc,k}$, $U_{dB}$, and $U_{qB}$ are given in FIG. 15. The related control power requirements for each energy storage system $P_{s,k}$, $P_{dc,k}$, $P_{dB}$, and $P_{qB}$ are shown in FIG. 16. The peak power requirement for the energy storage device on DC microgrid one $P_{dc,1}$ is shown in FIG. 17, which occurs at t=0.4 seconds with a magnitude of 37.5 kW. The corresponding energy storage requirements $E_{s,k}$, $E_{dc,k}$, $Ed_B$, and $E_{qB}$ are shown in FIG. 18. These profiles can be used to size the actual energy storage devices required to maintain the indicated microgrid performance shown in the other simulation results. The other reference states are shown for the DC boost converter side: duty cycles, $\lambda_{s,k}$, given in FIG. 19, the AC boost convert side; duty cycles, $\lambda_{dc,k}$, given in FIG. 20; and the corresponding phase angles, $\phi_{dc,k}$ given in FIG. 21; respectively. All these reference states were used as set points to the feedback controllers or as updates to the model as part of the $\tilde{R}$ skew-symmetric matrix.

The present invention has been described as a nonlinear power flow controller for networked AC/DC microgrids. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A nonlinear networked AC/DC microgrid, comprising:
    at least two DC microgrids, each DC microgrid comprising a DC power source, an energy storage source in series with the DC power source, a boost converter to boost the output of the DC power source and the energy storage source to feed a DC bus, and an AC inverter to invert the DC output of the DC bus to an AC output to feed an AC bus;
    an AC ring bus for tying the AC outputs of the AC buses of the at least two DC microgrids together to provide AC power;
    at least one energy storage, source feeding to the AC ring bus;
    an AC load for consuming the AC power received from the AC ring bus; and
    a controller for matching the AC power provided by the AC ring bus to the power consumed by the AC load whilst maintaining stable operation of the networked AC/DC microgrid, wherein the controller comprises
    a feedforward controller that calculates a reference steady-state current and voltage at the AC ring bus for an update period and controls the power, duty cycle, and phase angle of each DC microgrid to match the reference steady-state current and voltage at the AC ring bus for the update period, and
    a feedback controller that calculates an error state between the steady-state reference current and voltage at the AC ring bus and the current and voltage to the AC load and adds sufficient power from the energy storage sources to reduce the error state towards zero.

2. The nonlinear networked AC/DC microgrid of claim 1, wherein the DC power source comprises a varying DC source.

3. The nonlinear networked AC/DC microgrid of claim 2, wherein the varying DC source comprises a photovoltaic cell, a wind generator, or a wave energy converter.

4. The nonlinear networked AC/DC microgrid of claim 1, wherein at least one of the energy storage sources comprises a battery, capacitor bank, flywheel, or general power electronic storage device.

5. The nonlinear networked AC/DC microgrid of claim 1, further comprising an energy storage source connected to the DC bus to support variations in the AC load.

6. The nonlinear networked AC/DC microgrid of claim 1, wherein the feedback controller comprises a proportional-integral feedback controller and the proportional and integral controller gains are calculated from a Hamiltonian Surface Shaping and Power Flow Control method that models the dynamical physical characteristics and kinetic and potential energies of the AC/DC networked microgrid.

\* \* \* \* \*